US012561908B2

(12) United States Patent
Li et al.

(10) Patent No.: US 12,561,908 B2
(45) Date of Patent: Feb. 24, 2026

(54) TOPOLOGICALLY CONSISTENT MULTI-VIEW FACE INFERENCE USING VOLUMETRIC SAMPLING

(71) Applicants: University of Southern California, Los Angeles, CA (US); Max-Planck-Gesellschaft zur Foerderung der Wissenschaften e.V., Munich (DE)

(72) Inventors: Tianye Li, Los Angeles, CA (US); Yajie Zhao, Los Angeles, CA (US); Shichen Liu, Los Angeles, CA (US); Jiayi Liu, Los Angeles, CA (US); Hao Li, Los Angeles, CA (US); Timo Bolkart, Dietmannsried (DE)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 17/735,568

(22) Filed: May 3, 2022

(65) Prior Publication Data

US 2023/0031750 A1     Feb. 2, 2023

Related U.S. Application Data

(60) Provisional application No. 63/183,503, filed on May 3, 2021.

(51) Int. Cl.
*G06T 17/20* (2006.01)
*G06T 3/40* (2006.01)

(52) U.S. Cl.
CPC ............... *G06T 17/20* (2013.01); *G06T 3/40* (2013.01)

(58) Field of Classification Search
None
See application file for complete search history.

(56) References Cited

U.S. PATENT DOCUMENTS

| | | | |
|---|---|---|---|
| 10,304,244 B2 | 5/2019 | Chuang |
| 10,489,956 B2 | 11/2019 | Dionne |
| 10,614,613 B2 | 4/2020 | Fricke |
| 10,861,230 B2 | 12/2020 | Patrick |
| 10,977,773 B2 | 4/2021 | Hemmer |
| 11,250,186 B2 | 2/2022 | Bussman |

(Continued)

OTHER PUBLICATIONS

Huang, Zeng, et al. "Deep volumetric video from very sparse multi-view performance capture." Proceedings of the European Conference on Computer Vision (ECCV). 2018.*

(Continued)

*Primary Examiner* — Sultana M Zalalee
(74) *Attorney, Agent, or Firm* — NIXON PEABODY LLP

(57) ABSTRACT

Systems and methods are provided for generating topologically consistent meshes across various subjects, objects, and/or various facial expressions using a volumetric representation. In one example, a progressive mesh generation network is configured to embed the topological structure of a subject or an object in a feature volume sampled from a geometry-aware local features. Further, a coarse-to-fine iterative architecture facilitates dense and accurate facial mesh predictions using a consistent mesh topology. In another example, one or more high-quality asset maps may be generated from a final base mesh.

12 Claims, 25 Drawing Sheets
(15 of 25 Drawing Sheet(s) Filed in Color)

(56) References Cited

U.S. PATENT DOCUMENTS

| | | | | |
|---|---|---|---|---|
| 11,308,673 | B2 | 4/2022 | Comer | |
| 2015/0131924 | A1* | 5/2015 | He | H04N 5/2628 |
| | | | | 382/284 |
| 2019/0294970 | A1* | 9/2019 | Fidler | G06N 3/045 |
| 2021/0295606 | A1* | 9/2021 | Kim | G06T 17/20 |
| 2021/0343080 | A1* | 11/2021 | Kim | G06T 17/20 |

OTHER PUBLICATIONS

Qian, Yue, et al. "PUGeo-Net: A geometry-centric network for 3D point cloud upsampling." European conference on computer vision. Cham: Springer International Publishing, 2020.*

* cited by examiner

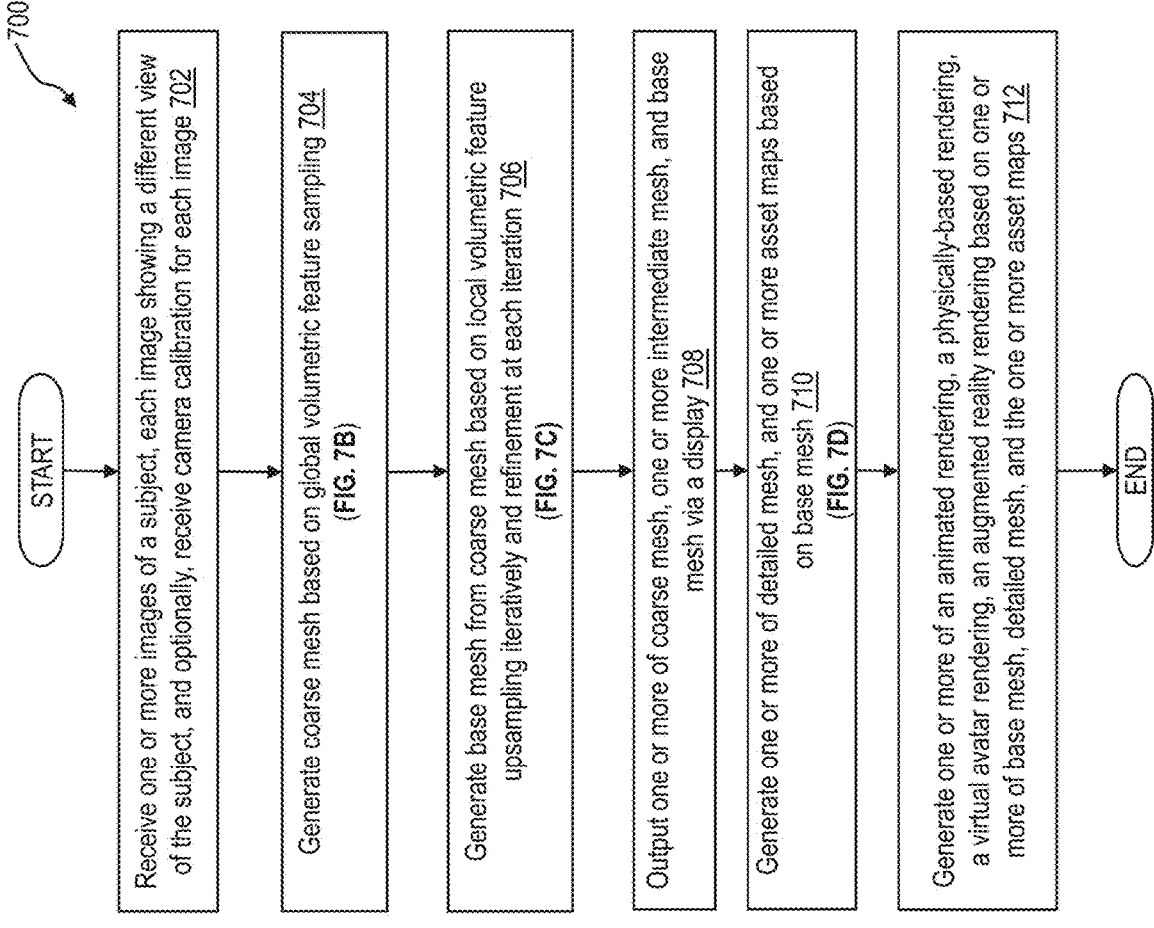

700

START

Receive one or more images of a subject, each image showing a different view of the subject, and optionally, receive camera calibration for each image 702

Generate coarse mesh based on global volumetric feature sampling 704 (FIG. 7B)

Generate base mesh from coarse mesh based on local volumetric feature upsampling iteratively and refinement at each iteration 706 (FIG. 7C)

Output one or more of coarse mesh, one or more intermediate mesh, and base mesh via a display 708

Generate one or more of detailed mesh, and one or more asset maps based on base mesh 710 (FIG. 7D)

Generate one or more of an animated rendering, a physically-based rendering, a virtual avatar rendering, an augmented reality rendering based on one or more of base mesh, detailed mesh, and the one or more asset maps 712

END

FIG. 7A

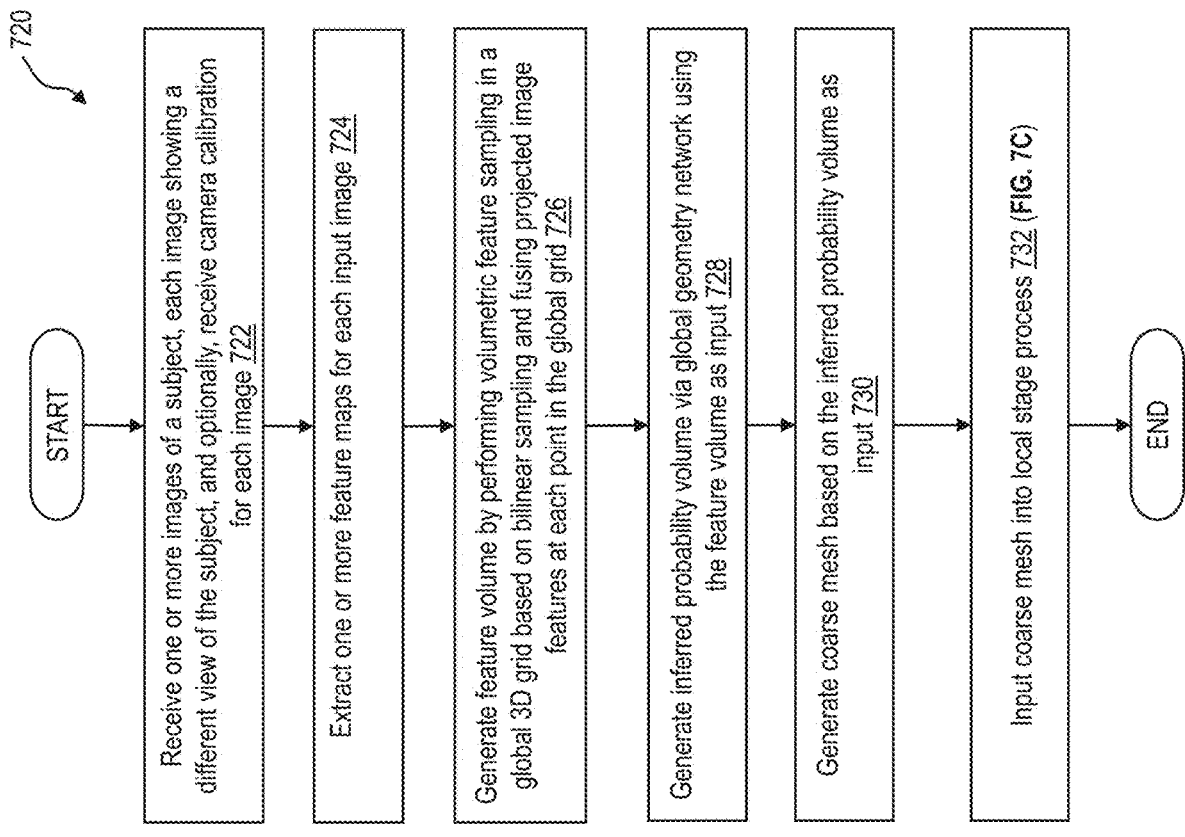

START

Receive one or more images of a subject, each image showing a different view of the subject, and optionally, receive camera calibration for each image 722

Extract one or more feature maps for each input image 724

Generate feature volume by performing volumetric feature sampling in a global 3D grid based on bilinear sampling and fusing projected image features at each point in the global grid 726

Generate inferred probability volume via global geometry network using the feature volume as input 728

Generate coarse mesh based on the inferred probability volume as input 730

Input coarse mesh into local stage process 732 (FIG. 7C)

END

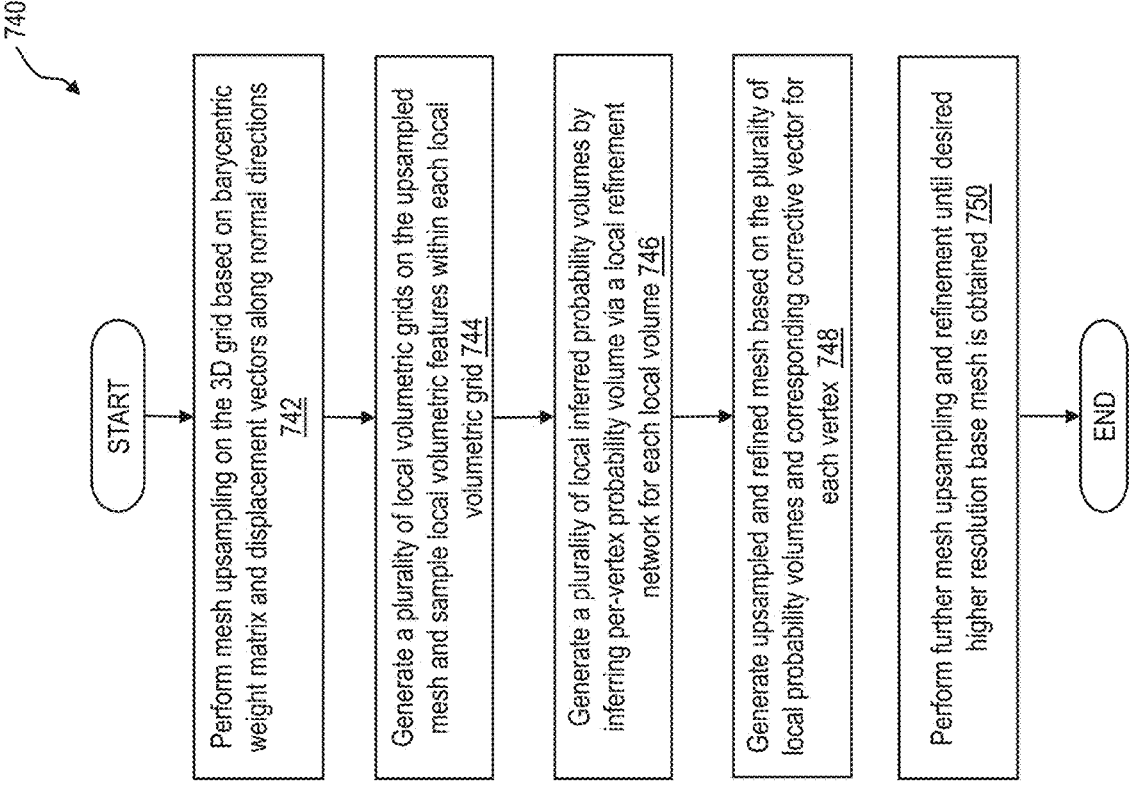

START

Perform mesh upsampling on the 3D grid based on barycentric weight matrix and displacement vectors along normal directions 742

Generate a plurality of local volumetric grids on the upsampled mesh and sample local volumetric features within each local volumetric grid 744

Generate a plurality of local inferred probability volumes by inferring per-vertex probability volume via a local refinement network for each local volume 746

Generate upsampled and refined mesh based on the plurality of local probability volumes and corresponding corrective vector for each vertex 748

Perform further mesh upsampling and refinement until desired higher resolution base mesh is obtained 750

END

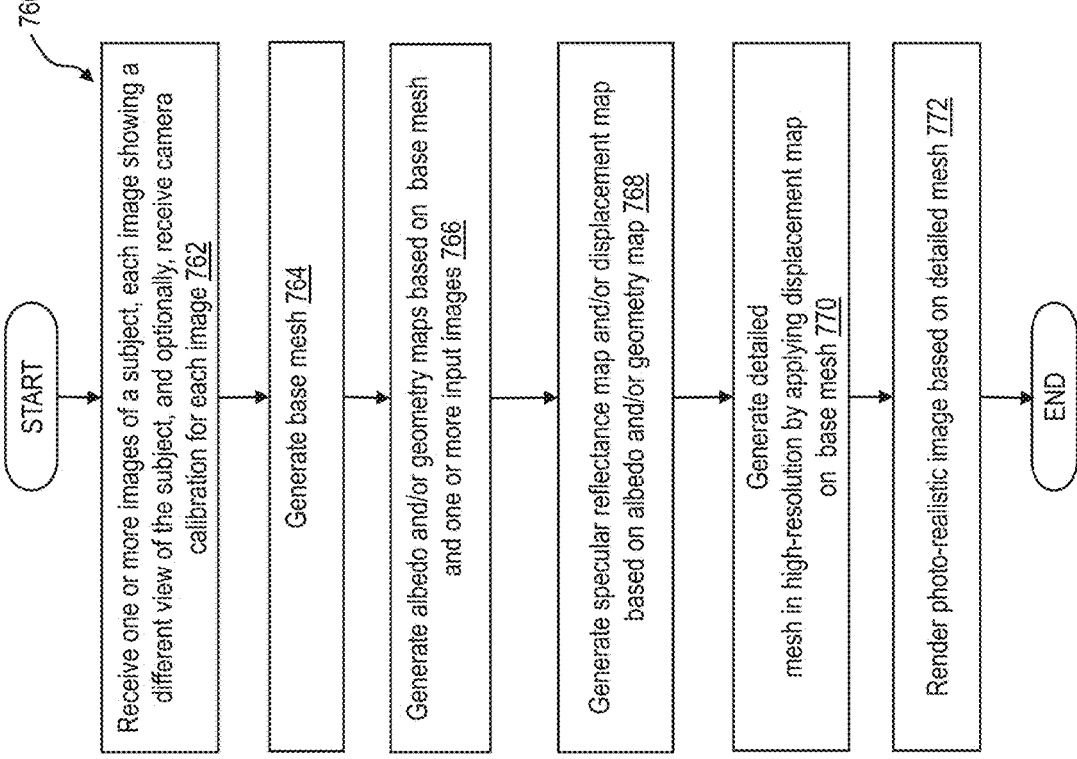

760

START

Receive one or more images of a subject, each image showing a different view of the subject, and optionally, receive camera calibration for each image 762

Generate base mesh 764

Generate albedo and/or geometry maps based on base mesh and one or more input images 766

Generate specular reflectance map and/or displacement map based on albedo and/or geometry map 768

Generate detailed mesh in high-resolution by applying displacement map on base mesh 770

Render photo-realistic image based on detailed mesh 772

END

FIG. 7D

TOPOLOGICALLY CONSISTENT MULTI-VIEW FACE INFERENCE USING VOLUMETRIC SAMPLING

CROSS REFERENCE TO RELATED APPLICATIONS

This application claims priority to U.S. Provisional Application No. 63/183,503, filed May 3, 2021 titled TOPOLOGICALLY CONSISTENT MULTI-VIEW FACE INFERENCE USING VOLUMETRIC SAMPLING, the contents of all of which are incorporated herein by reference.

STATEMENT REGARDING FEDERALLY SPONSORED RESEARCH OR DEVELOPMENT

This invention was made with government support under Grant Nos. 042741-396242 awarded by the Defense Advanced Research Projects Agency, N00014-17-S-F014 awarded by the Office of Naval Research, and W911NF-14-D-0005 and W911NF-20-2-0053 awarded by the Army Research Laboratory—Army Research Office. The government has certain rights in the invention.

FIELD

The present invention generally relates to mesh generation and/or detail and appearance maps for animation and photorealistic rendering.

BACKGROUND

The following description includes information that may be useful in understanding the present invention. It is not an admission that any of the information provided herein is prior art or relevant to the presently claimed invention, or that any publication specifically or implicitly referenced is prior art.

High-fidelity object digitization solutions often combine multi-view stereo (MVS) techniques for three-dimensional (3D) reconstruction and a non-rigid registration step to establish dense correspondence across identities and expressions. Such approaches require tedious clean-up after the MVS step, as 3D scans are typically affected by noise and outliers and contain hairy surface regions that need to be cleaned up. Furthermore, mesh registration tends to fail for extreme facial expressions. Learning-based methods often use an underlying 3D morphable model (3DMM) to ensure robustness, but this limits the output accuracy for extreme facial expressions.

SUMMARY

Methods and systems are provided for 3D mesh generation from multi-view images. Further, method and systems are provided for generating maps from the multi-view images based on the 3D mesh generation for high-fidelity rendering. The 3D mesh generation and/or high-resolution map generation methods described herein may be utilized in a variety of applications, including film animation, gaming, as well consumer applications, including but not limited to telepresence in augmented reality/virtual reality (AR/VR), virtual fashion models, teleconference and/or social media avatars, and virtual assistants.

While fully automated single-view avatar digitization solutions exist, professional studios still opt for high resolution multi-view images as input, to ensure the highest possible fidelity and surface coverage in a controlled setting instead of unconstrained input data. Typically, high-resolution geometric details (<1 mm error) are desired along with high resolution physically-based material properties (at least 4K). Furthermore, to build a fully rigged face model for animation, a large number of facial scans and alignments (often over 30) are performed, typically following some conventions based on the Facial Action Coding System (FACS).

An example approach used in production uses a multi-view stereo acquisition process to capture detailed 3D scans of each facial expression, and a non-rigid registration or inference method to warp a 3D face model to each scan in order to ensure consistent mesh topology. Between these two steps, manual clean-up is often necessary to remove artifacts and unwanted surface regions, especially those with facial hair (beards, eyebrows) as well as teeth and neck regions. The registration process is often assisted with manual labeling tasks for correspondences and parameter tweaking to ensure accurate fitting. In a production setting, a completed rig of a model can easily take up to a week to finalize.

Some approaches attempt to automate the above process by fitting a 3D model directly to a calibrated set of input images. The multi-view stereo face modeling method of is not only particularly slow, but relies on dynamic sequences and carefully tuned parameters for each subject to ensure consistent parameterization between expressions. In particular facial expressions that are not captured continuously cannot ensure accurate topological consistencies. Some other approaches use a 3D morphable model (3DMM) inference based on deep learning to obtain a coarse initial facial expression. However, the 3DMM-based approaches lack fitting accuracy. As an example, the 3DMM-based approaches cannot infer extreme expressions due to the constraints of linear 3DMMs and fitting tightly to the ground-truth face surfaces due to the global nature of their regression architectures. Further, if additional photometric refinement is employed, unwanted region such as facial hair is fitted into the mesh construction, which introduces unwanted artifacts.

The inventors herein have recognized the above-mentioned disadvantages, and provide methods and systems for generating one or more of a 3D geometrical mesh and a set of texture and/or appearance maps from multi-view input images for high-fidelity rendering. In one example, a method, comprises: receiving a set of multi-view images including a subject; generating a three-dimensional mesh reconstruction of the subject based on one or more of a global volumetric sampling and a local volumetric sampling; and causing the three-dimensional mesh reconstruction to be output on to an output device In this way, by using a volumetric approach, topologically consistent 3D mesh is inferred using multi-view images. Further, the volumetric approach is generalizable and effectively captures a wider range of expressions and subtle deformation details on the subject. Furthermore, the volumetric approach described herein enables a dense 3D mesh generation as well as production of additional assets for high-fidelity production use cases, such as albedo, specular, and high-resolution displacement maps, at faster speeds (e.g., at least three times faster than previous approaches)

In one example, the three-dimensional reconstructed mesh is generated using a progressive mesh generation network that can infer a topologically consistent mesh directly. Vertex locations are predicted as probability distributions, along with volumetric features that are extracted using the underlying multi-view geometry. Further, a topological structure of the face is embedded into a volumetric grid using a hierarchical mesh representation and coarse-to-fine network.

Experimental results (provided further below) demonstrate that the methods and systems described herein can produce highly accurate geometry consistent with topology automatically, without the need to rely on manual clean-up and parameter tuning. Further, the volumetric approach provides improved accuracy for subjects with facial hair and can infer extreme expressions more accurately and consistently. Since a consistent parameterization can be ensured across facial identities and expressions, the volumetric approach can be easily scaled for digitization of high-fidelity facial avatars. Thus, not only reduce the turnaround time for production is reduced, but it also provides a solution for generating large facial datasets, which is often associated with excessive manual labor.

In one embodiment, a method, comprises: receiving, at one or more processors, a plurality of images of the subject or the object, each of the plurality of the images comprising a different view of the subject or the object; generating, via the one or more processors, a three-dimensional initial coarse mesh based on the plurality of images according to a global volumetric feature sampling algorithm; generating, via the one or more processors, a three-dimensional final base mesh of the subject or the object; generating, via the one or more processors, an image rendering of the subject or the object based on the three-dimensional final base mesh; and displaying, via a display portion of a user interface communicatively coupled to the one or more processors, one or more of the initial coarse mesh, the final base mesh, and the image rendering; wherein generating the three-dimensional final base mesh comprises iteratively upsampling starting from the initial coarse mesh to generate a series of intermediate meshes with increasing mesh density.

In another embodiment, a system comprises: one or more processors; one or more memories storing instructions that are executable by the one or more processors to cause the system to at least: receive a plurality of images of a subject or an object, each the plurality of images corresponding to a different camera view angle and a plurality of corresponding camera calibration parameters for each image; generate a three-dimensional coarse mesh based on the plurality of images and the plurality of camera calibration parameters, the three-dimensional initial coarse mesh comprising a first number of vertices; and generate a three-dimensional final base mesh of the subject or the object from the initial coarse mesh, the three-dimensional final base mesh comprising a final number of vertices greater than the first number of vertices of the initial coarse mesh; wherein generating the three-dimensional base mesh from the initial coarse mesh comprises iteratively generating a series of intermediate meshes, each successive intermediate mesh having a greater number of vertices than a previous intermediate mesh and less than the final number of vertices of the final base mesh.

In another embodiment, a system, comprises: one or more processors; one or more memories storing instructions that are executable by the one or more processors to cause the system to: receive at least two input images of a subject or an object, each of the at least two input images corresponding to a different view of the subject or the object; generate a three-dimensional initial coarse mesh of the subject or the object based on the at least two input images, the three-dimensional initial coarse mesh comprising a first number of vertices; and generate a three-dimensional final base mesh of the subject or the object from the initial coarse mesh, the three-dimensional final base mesh comprising a final number of vertices greater than the first number of vertices of the initial coarse mesh; wherein generating the three-dimensional base mesh from the initial coarse mesh comprises iteratively upsampling and refining a plurality of vertices, starting from the initial coarse mesh to generate a series of intermediate meshes, each successive intermediate mesh having a greater number of vertices than a previous intermediate mesh and less than the final number of vertices of the final base mesh.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF DRAWINGS

The patent or application file contains at least one drawing executed in color. Copies of this patent or patent application publication with color drawing(s) will be provided by the Office upon request and payment of the necessary fee.

In order to describe the manner in which the above-recited disclosure and its advantages and features can be obtained, a more particular description of the principles described above will be rendered by reference to specific examples illustrated in the appended drawings. These drawings depict only example aspects of the disclosure, and are therefore not to be considered as limiting of its scope. These principles are described and explained with additional specificity and detail through the use of the following drawings.

US 12,561,908 B2

5

Figures 5A, 5B:
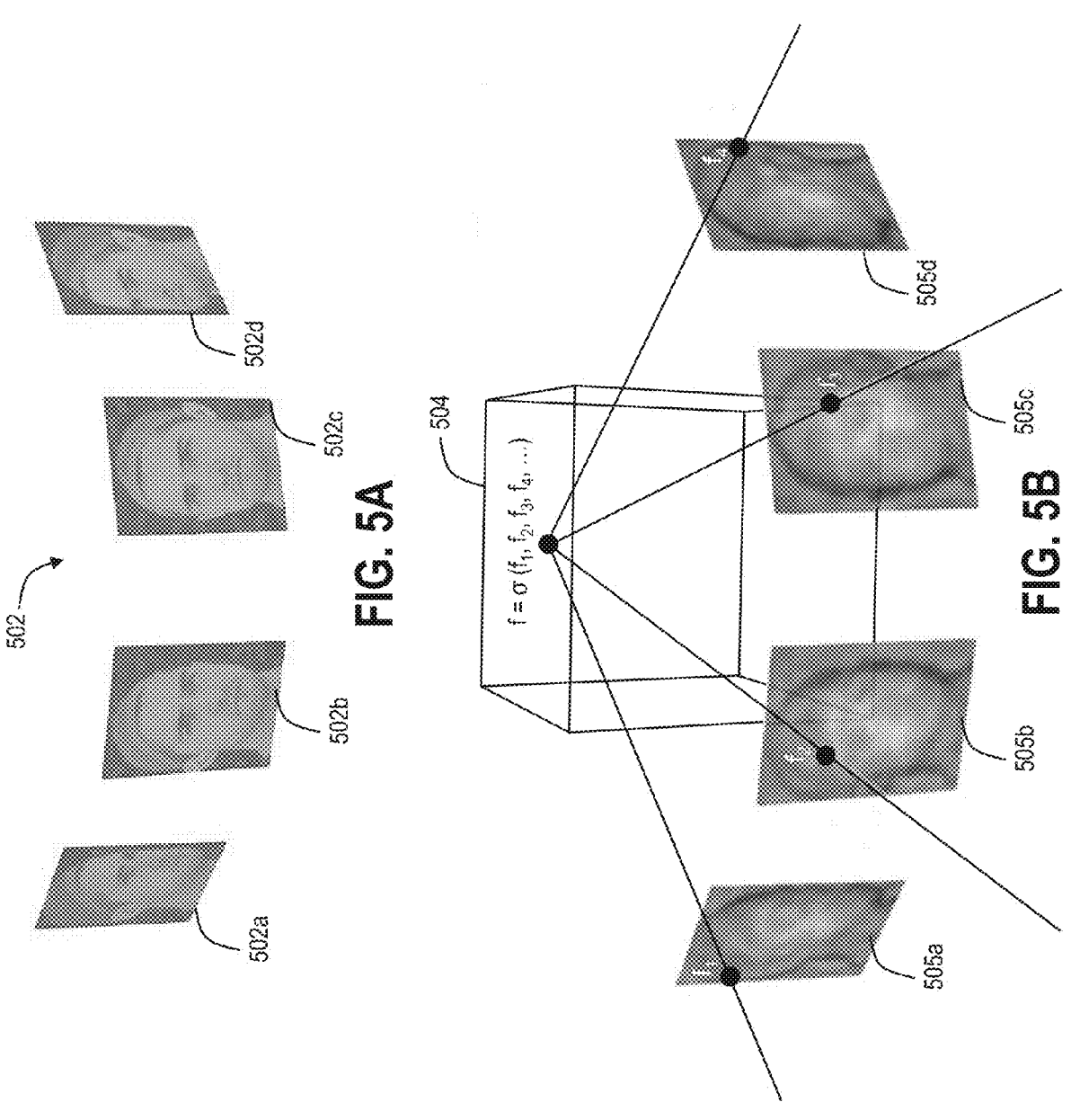
FIG. 5A shows an example set of input images, each image including a different view of a subject.
FIG. 5B shows an example global volumetric feature sampling illustration within a global 3D grid based on the set of input images from FIG. 5A.
Figure 5D:
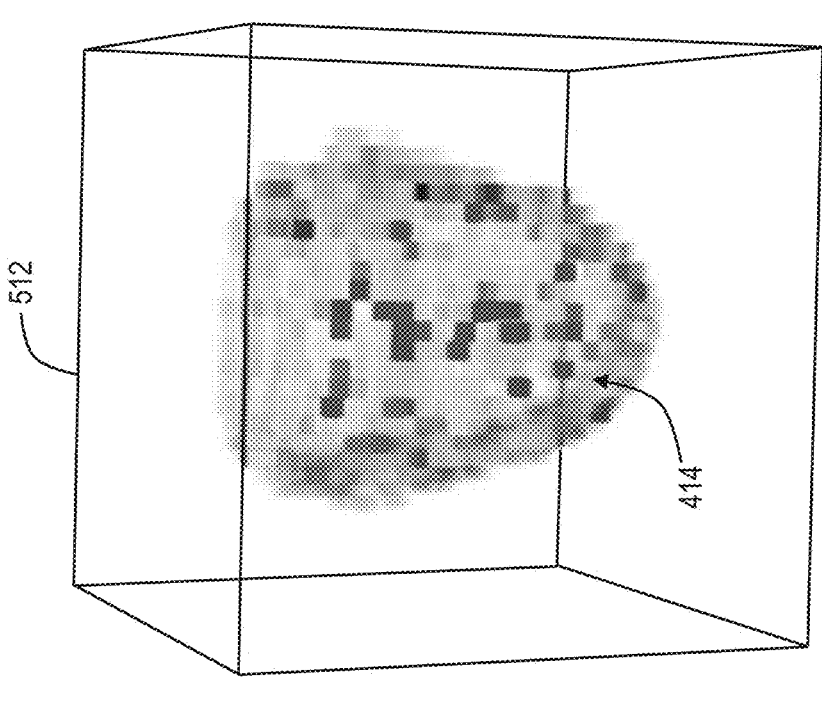
Figure 5C:
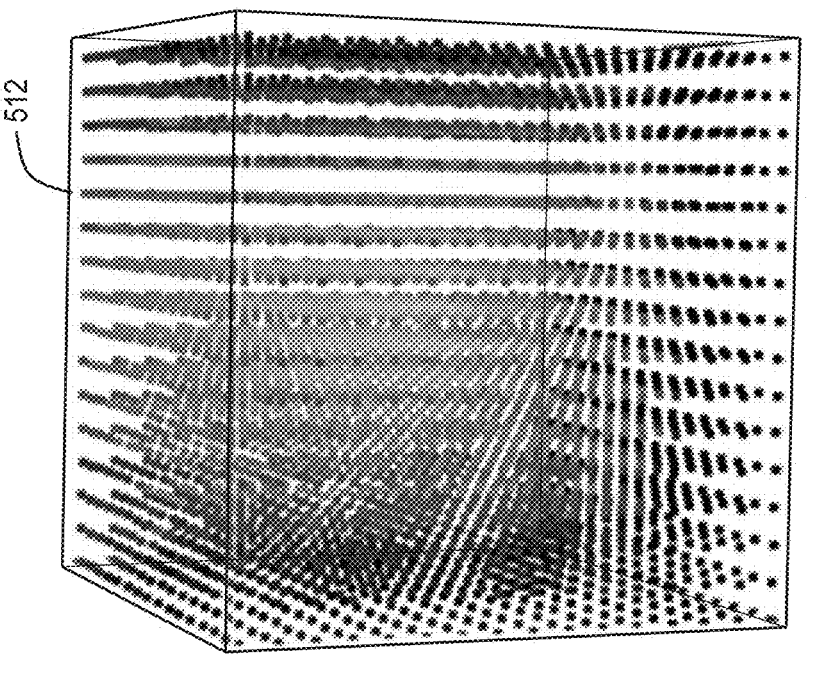
Figures 5E, 5F:
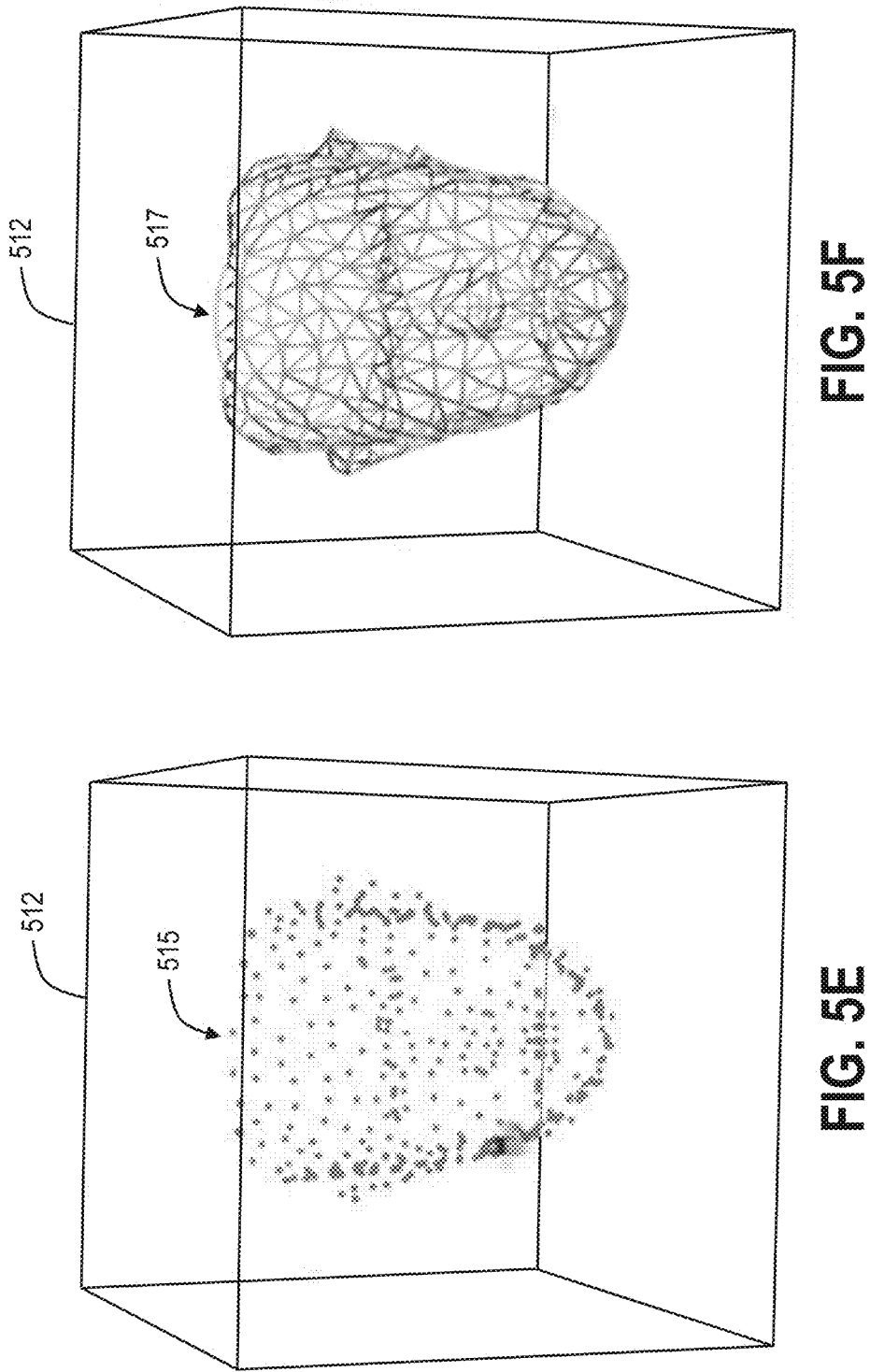
Figure 6:
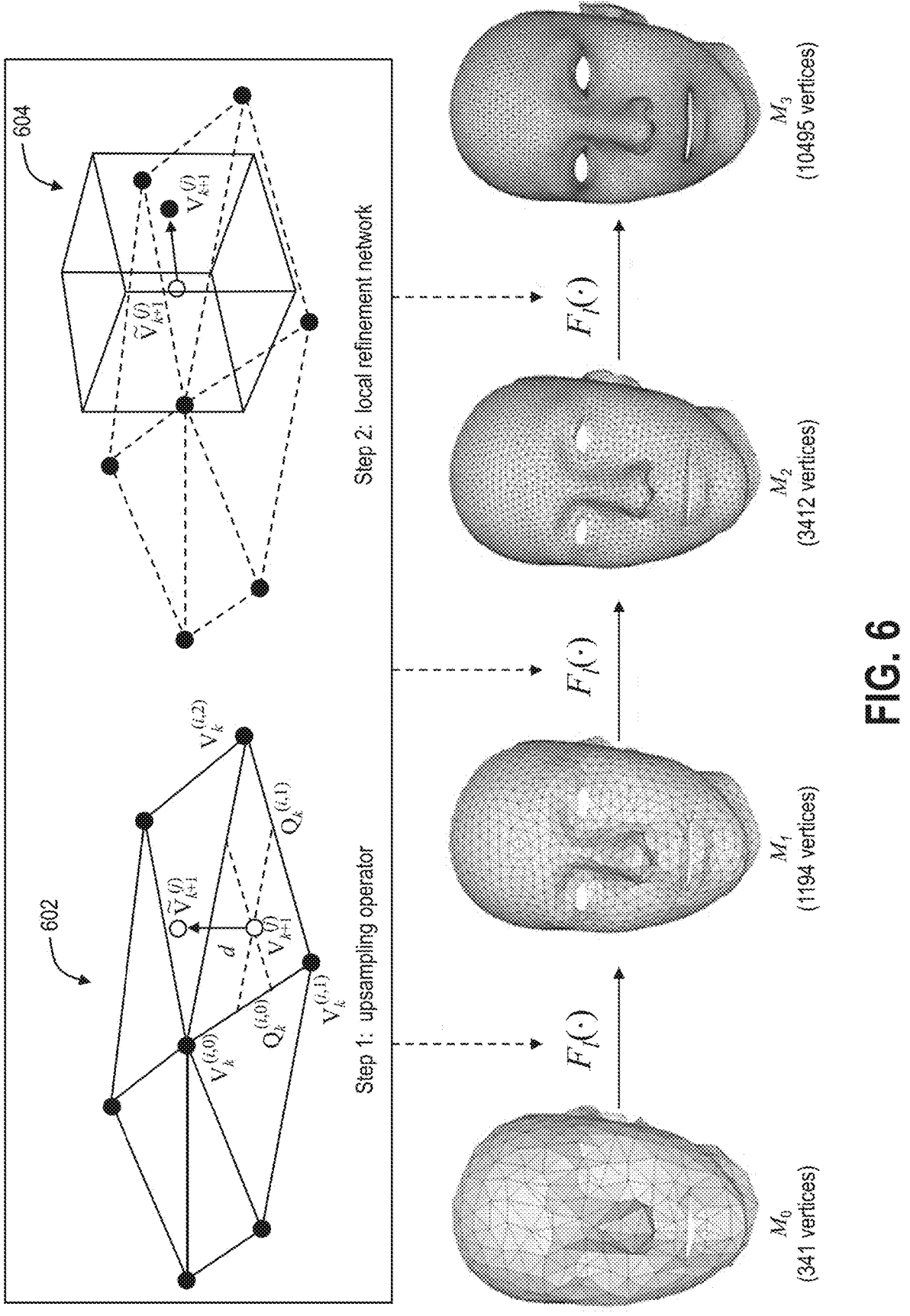
Figure 8:
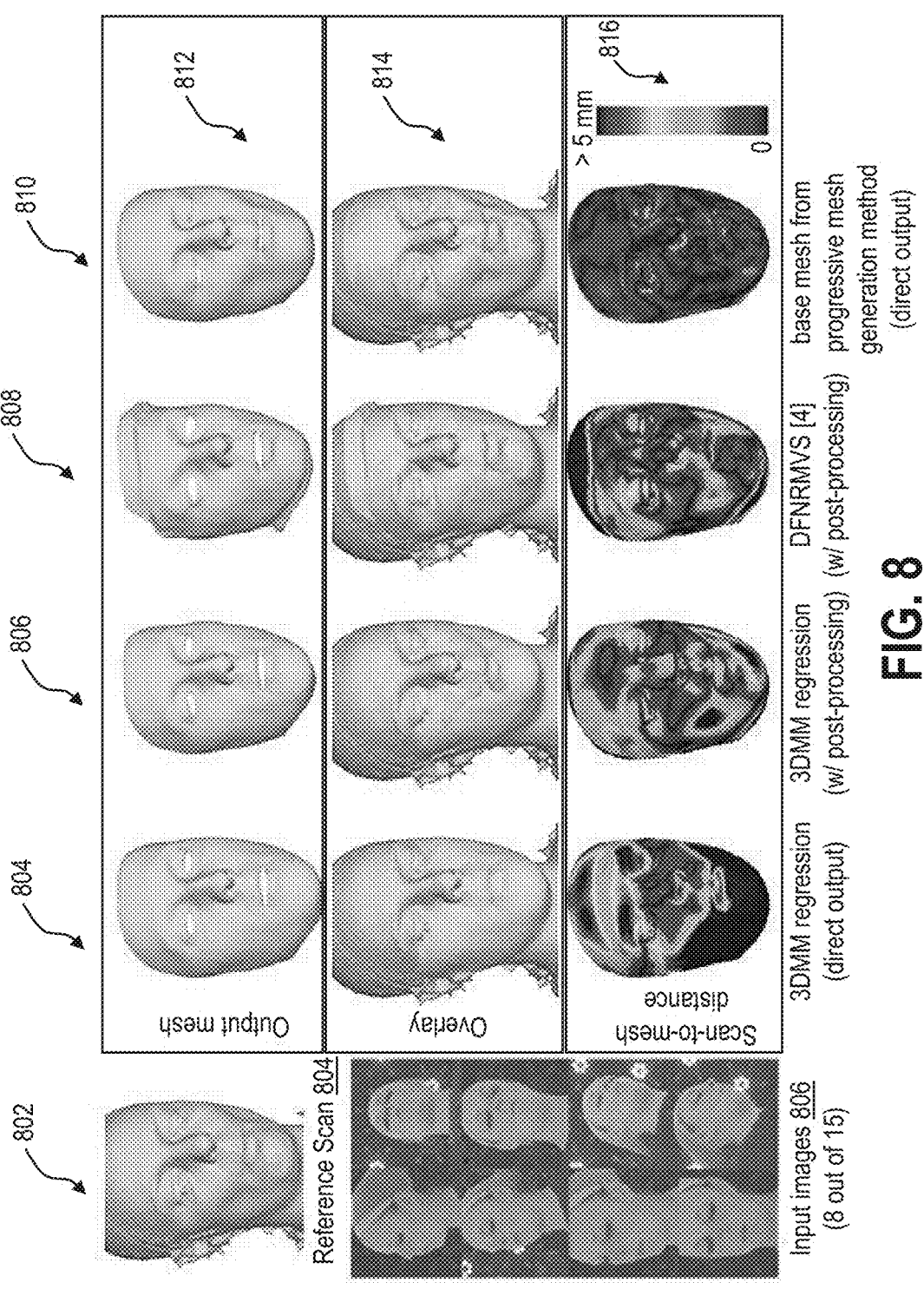
Figure 9:
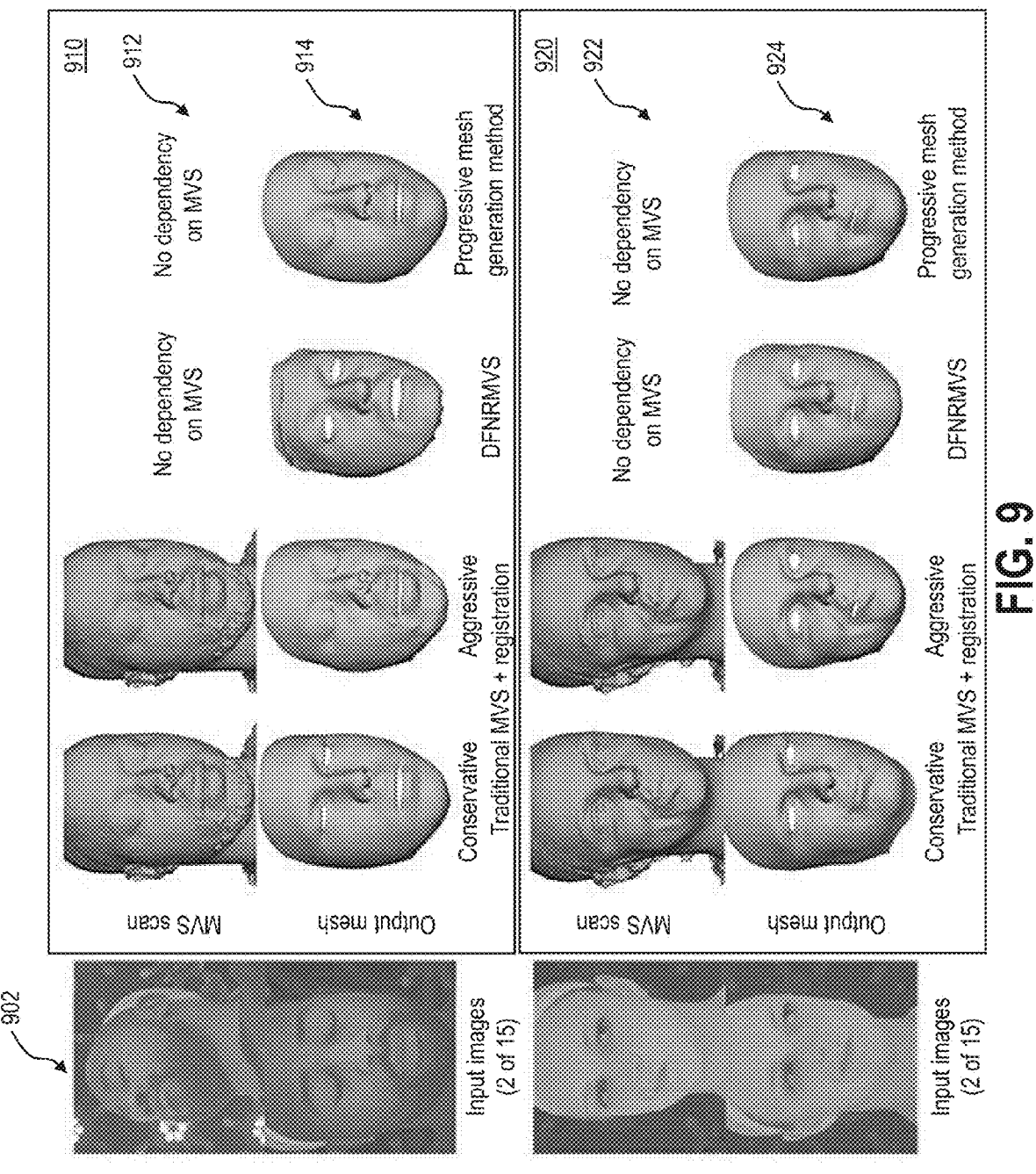
Figure 10:
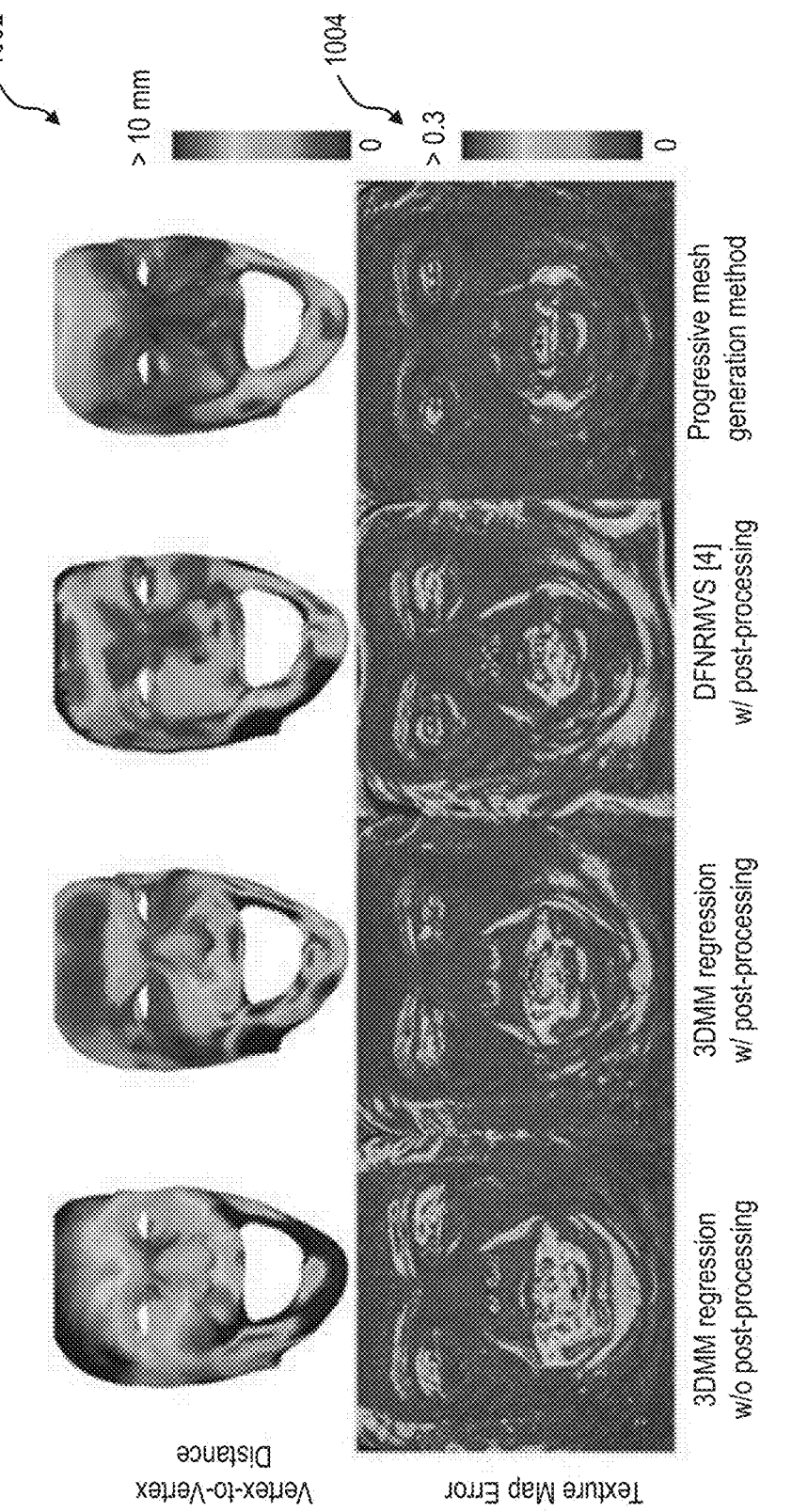
Figure 11:
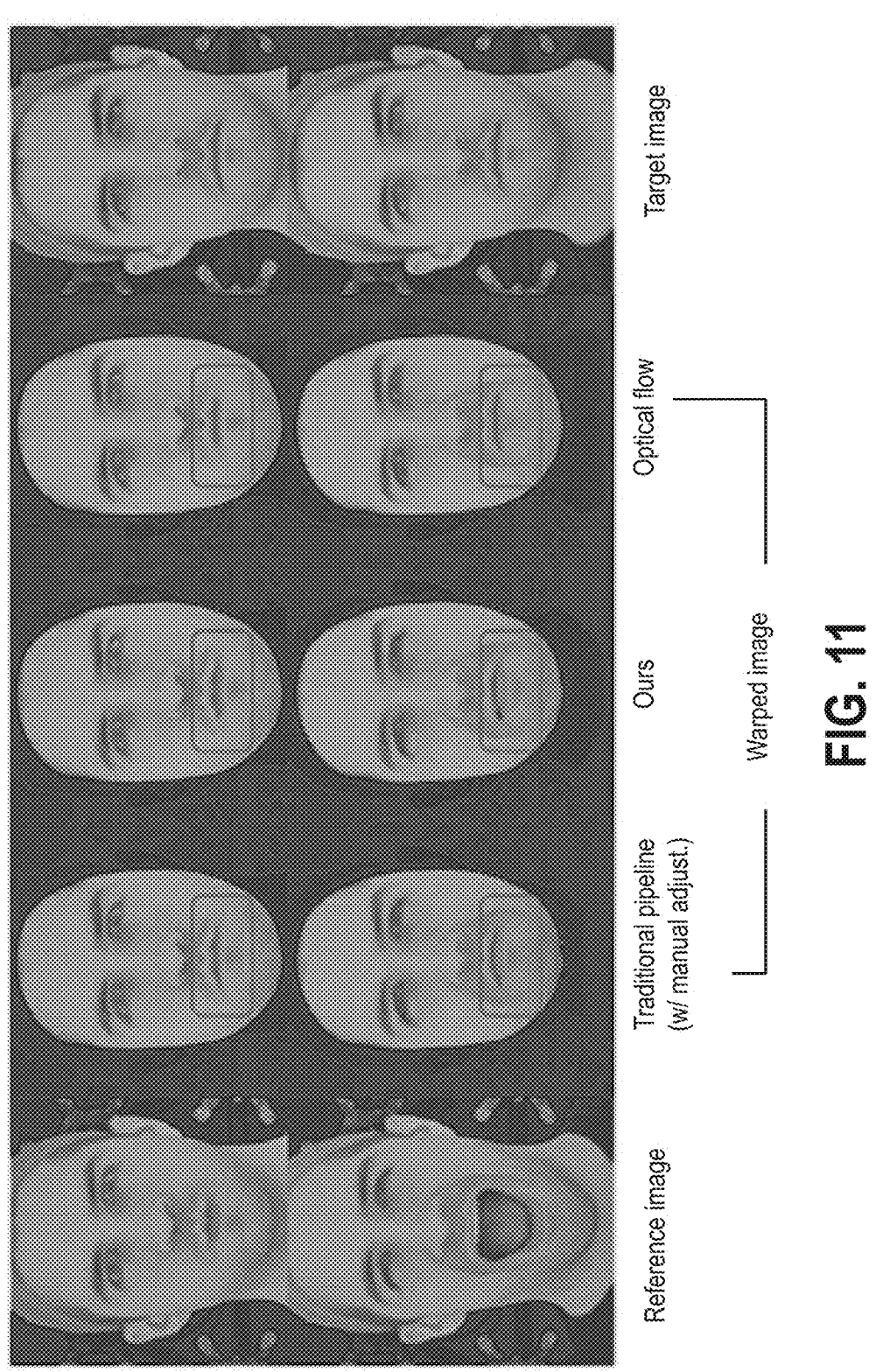
Figure 12:
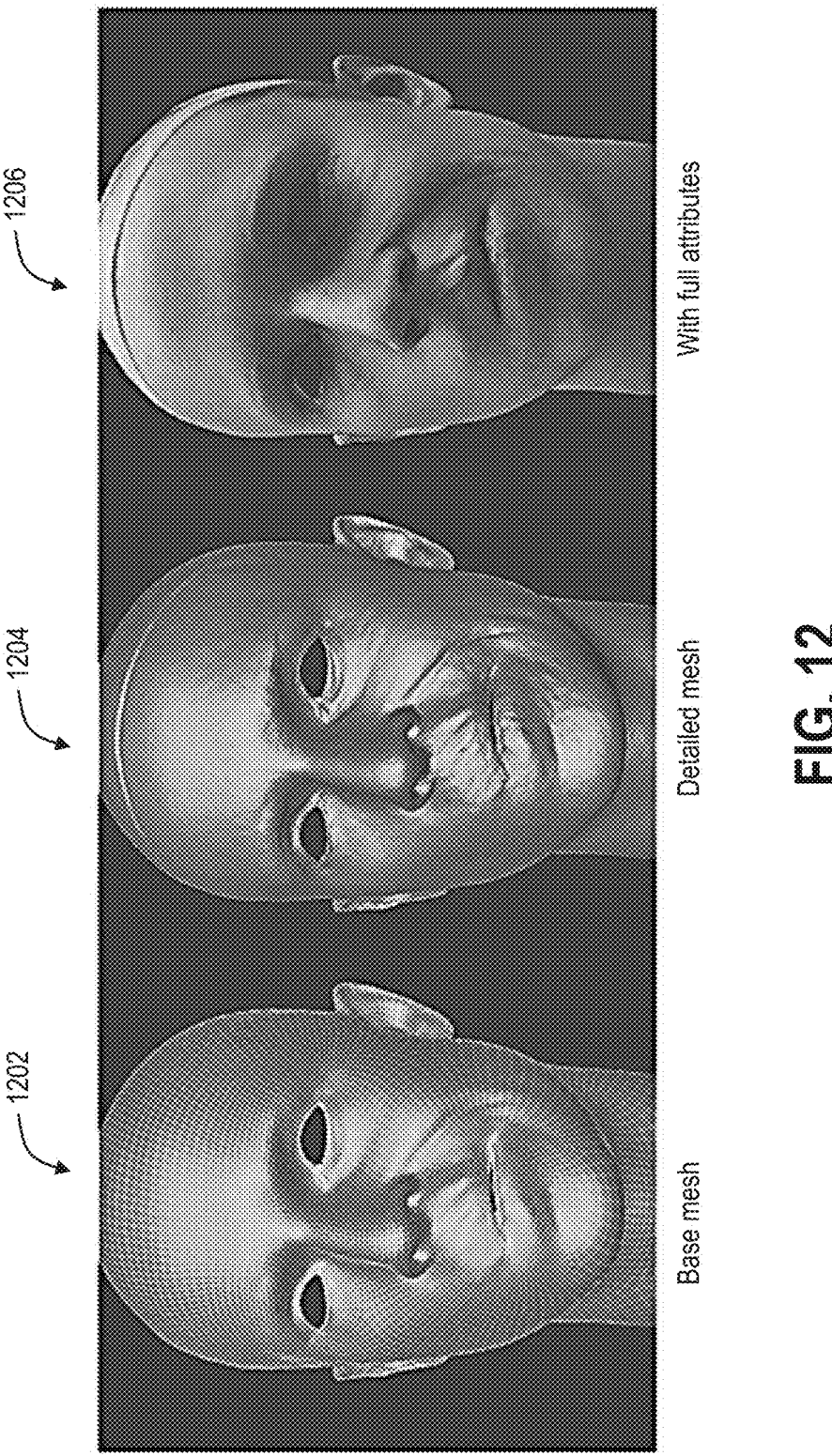
Figures 13A, 13B:
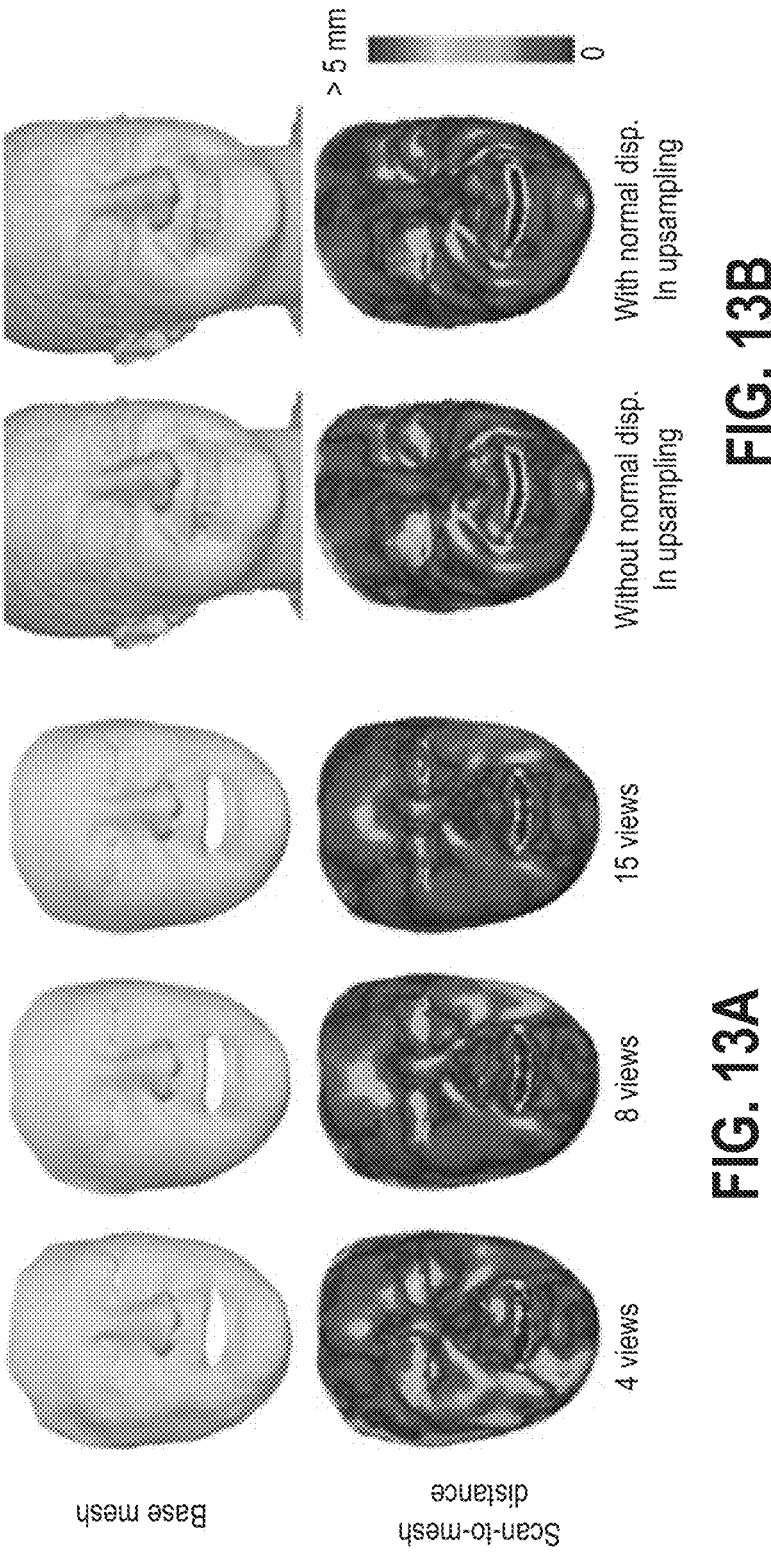
Figure 14:
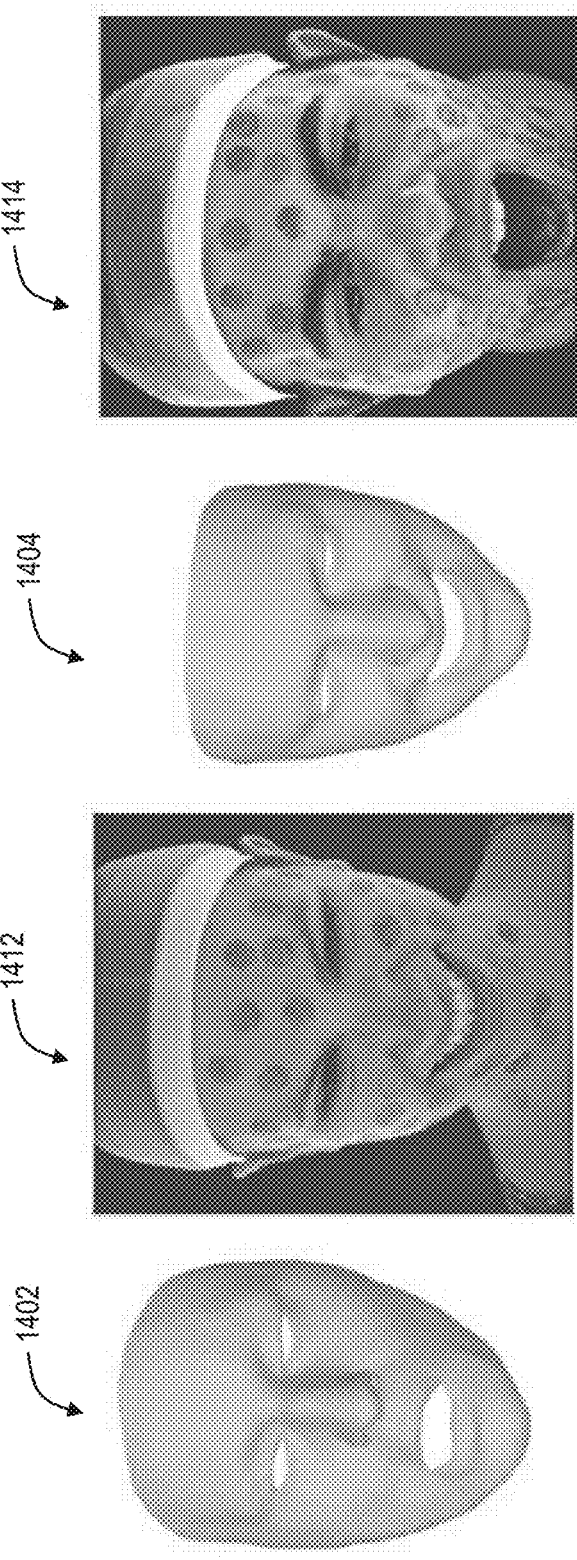
Figure 16:
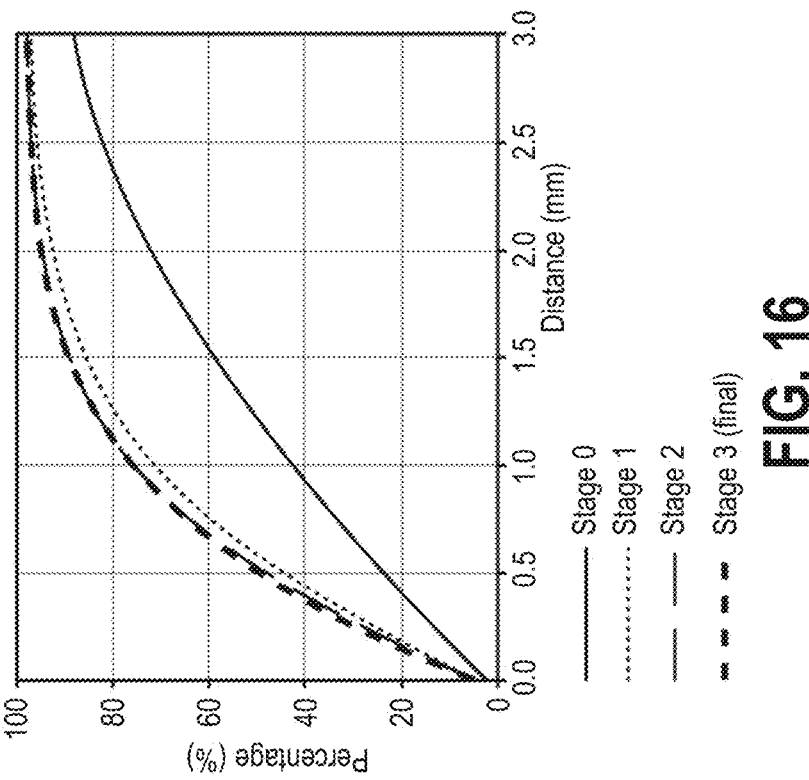
Figure 15:
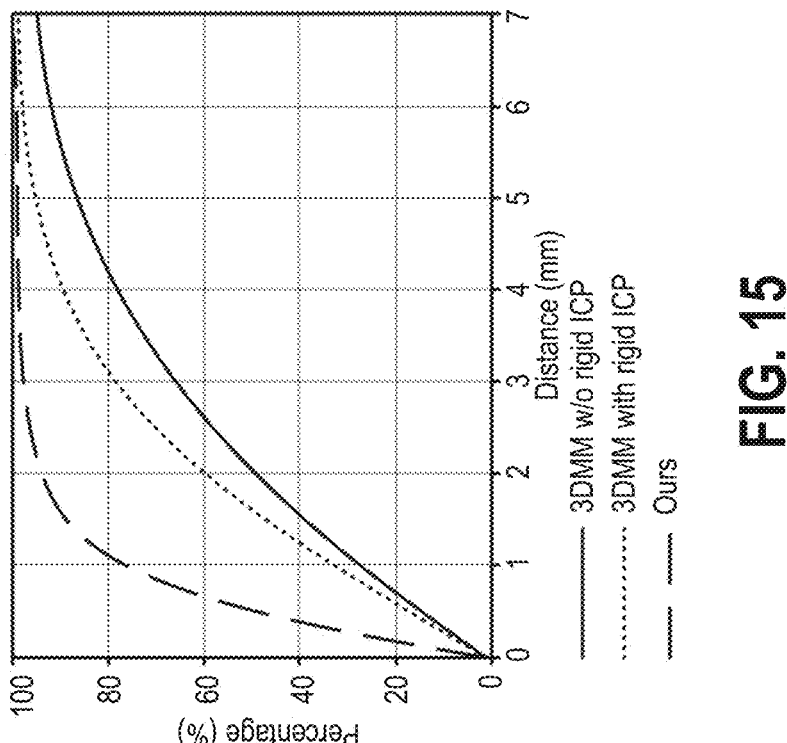
Figure 17:
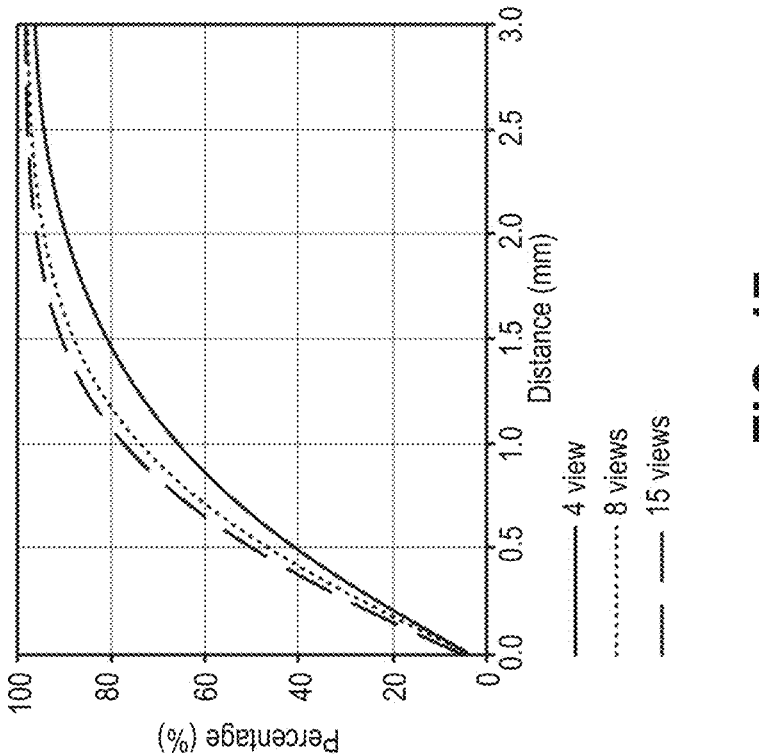
Figure 18:
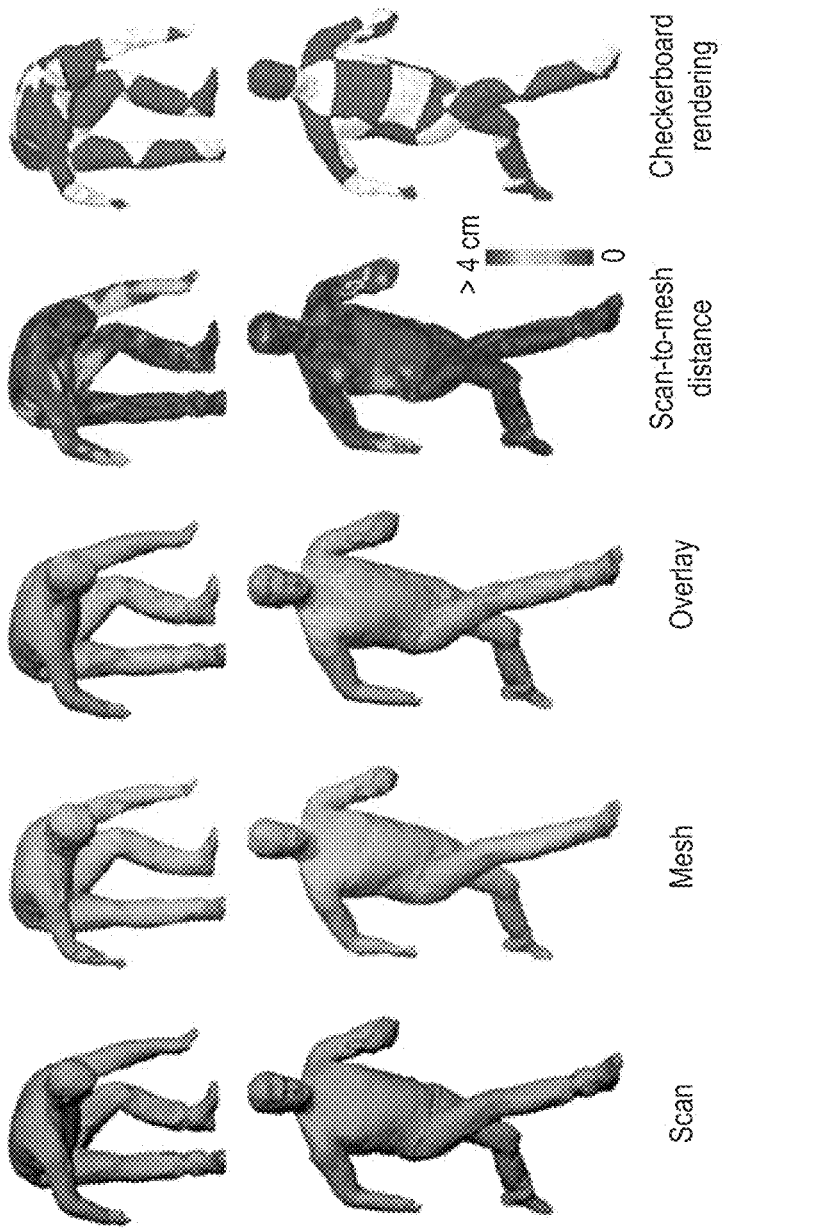
Figure 19:
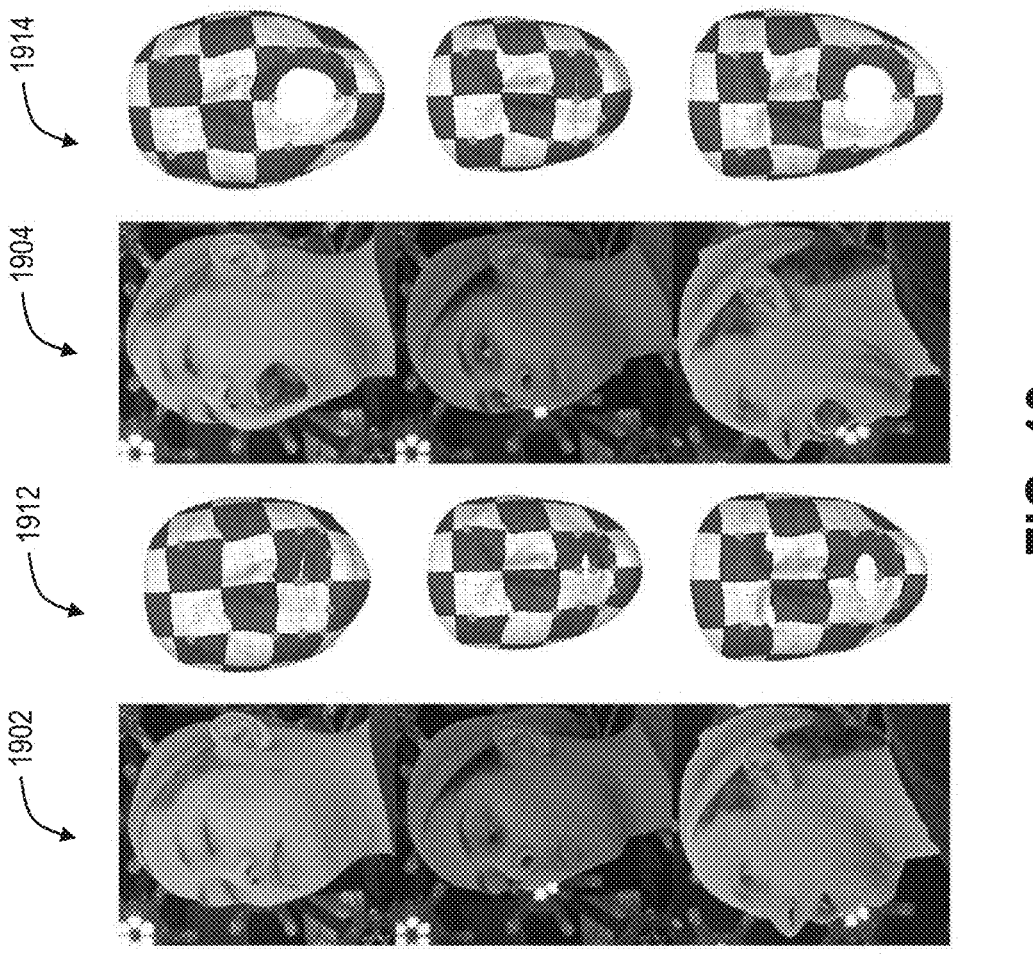

FIG. 5C shows an example feature volume generated according to global volumetric sampling corresponding to the set of input images from FIG. 5A;

FIG. 5D shows an example inferred probability volume obtained from the feature volume at FIG. 5C;

FIG. 5E shows an example set of vertices extracted from the inferred probability volume at FIG. 5D;

FIG. 5F shows an example initial coarse mesh generated based on the set of vertices at FIG. 5E;

FIG. 6 shows a schematic illustration of example iterative upsampling and refinement process, according to an embodiment of the disclosure;

FIG. 7A shows a flow chart of a high-level method for performing progressive mesh generation, according to an embodiment of the disclosure;

FIG. 7B shows a flow chart of a high-level method for generating an initial coarse mesh based on a global stage method, according to an embodiment of the disclosure;

FIG. 7C shows a flow chart of a high-level method for generating a final base mesh based on a local stage method, according to an embodiment of the disclosure;

FIG. 7D shows a flow chart of a high-level method for generating one or more asset maps and/or a detailed mesh based on a base mesh, according to an embodiment of the disclosure;

FIG. 8 shows an example qualitative comparison on geometric accuracy of mesh generated according to a progressive mesh generation network with respective mesh generated with previous methods;

FIG. 9 shows an example evaluation on robustness of progressive mesh generation;

FIG. 10 shows example visualization on correspondence accuracy;

FIG. 11 shows qualitative evaluation on correspondence compared to optical flow;

FIG. 12 shows an example visualization of a final base mesh, a detailed mesh obtained from the base mesh, and a rendered image;

FIG. 13A shows evaluation of robustness of progressive mesh generation method with respect to number of view;

FIG. 13B shows effect of normal displacement weights during mesh upsampling at local stage;

FIG. 14 shows example results provided by progressive mesh generation network using a different dataset;

FIG. 15 shows a graph depicting quantitative evaluation by cumulative error curves for scan-to-mesh distances among learning based methods;

FIG. 16 shows a graph depicting quantitative evaluation by cumulative error curves for scan-to-mesh distances among local refinement stages;

FIG. 17 shows a graph depicting quantitative evaluation by cumulative error curves for scan-to-mesh distances among various numbers of views;

FIG. 18 show example inference of clothed human body surfaces in consistent topology via progressive mesh generation method; and FIG. 19 shows example visualization of cross-subject dense correspondence of the base meshes inferred by progressive mesh generation method in a shared checkerboard texture.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced.

6

DETAILED DESCRIPTION

Unless defined otherwise, technical and scientific terms used herein have the same meaning as commonly understood by one of ordinary skill in the art to which this invention belongs. One skilled in the art will recognize many methods and materials similar or equivalent to those described herein, which could be used in the practice of the present invention. Indeed, the present invention is in no way limited to the methods and materials specifically described. For example, the Figures primarily illustrate the present invention in the gastrointestinal tract, but as indicated throughout, the disclosed systems and methods can be used for other applications.

In some embodiments, properties such as dimensions, shapes, relative positions, and so forth, used to describe and claim certain embodiments of the invention are to be understood as being modified by the term "about."

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Overview

Methods and systems are provided generation of 3D mesh of a subject and/or an object based on volumetric feature sampling. Further, methods and systems are provided for generation of generation of one or more asset maps based on the 3D mesh, which may be used as input into physically-based rendering engines for photo-realistic image generation. The one or more assets may be additionally, or alternatively used for generating animations, virtual avatars, etc. The one or more assets include but limited to a displacement map, a normal map, a specular reflectance map, an albedo map, bump map, a geometry map, or any combination thereof. In one implementation, the methods and systems for 3D mesh generation and/or one or more asset maps generation may be used for generating a 3D mesh and/or one or more asset maps associated with an image of a subject or a portion of the subject. The subject may be a living organism, such as a human, a non-human animal, plants, trees, etc. In another implementation, the methods and systems for 3D mesh generation and/or one or more asset generation may be used for generating a 3D mesh and/or one or more asset maps associated with an image of an object or a portion thereof. The object may be a non-living object, such as apparel, automobiles, furniture, etc. In another implementation, the methods and systems for 3D mesh generation and/or one or more asset generation may be used for generating a 3D mesh and/or one or more assets associated with an image of an environment or a portion thereof. The environment may be natural landscape (e.g., caves, mountains, etc.), an environment including natural and man-made structures, etc. In yet another implementation the methods and systems for 3D mesh generation and/or one or more asset generation may be used for generating a 3D mesh and/or one or more assets associated with an image of any combination of a subject, an object, an environment and/or portions thereof.

The following description and the examples herein will be primarily explained with respect to digitization; however, it will be appreciated that the methods for 3D mesh generation and/or one or more asset generation provided herein may be implemented for any subject, object, environment, a portion thereof, or any combination thereof.

In previous approaches, face acquisition or face capture is separated into two steps, 3D face reconstruction and registration. Facial geometry can be captured with laser scanners, passive Multi-View Stereo (MVS) capture systems, dedicated active photometric stereo systems, or depth sensors based on structured light or time-of-flight sensors. Among these, MVS is the most commonly used. Although these approaches produce high-quality geometry, they suffer from heavy computation due to the pairwise features matching across views, and they tend to fail in case of sparse view inputs due to the lack of overlapping neighboring views. Some approaches use deep neural networks to learn multi-view feature matching for 3D geometry reconstruction. Compared to classical MVS methods, these learning based methods represent a trade-off between accuracy and efficacy.

With regard to registration, previous methods use a template mesh and fit it to the scan surface by minimizing the distance between the scan's surface and the template. For optimization, the template mesh is commonly parameterized with a statistical shape space or a general blendshape basis. Other approaches directly optimize the vertices of the template mesh using a non-rigid Iterative Closest Point (ICP), with a statistical model as regularizer, or jointly optimize correspondence across an entire dataset in a groupwise fashion. Inventors herein have recognized that all these registration methods solve for facial correspondence independent from the data acquisition, and therefore, errors in the raw scan data propagate into the registration. Other approaches for high-quality registered 3D face are computationally slow (e.g. 25 minutes per frame for the coarse mesh reconstruction alone).

Some other approaches reconstruct 3D faces from unconstrained images or monocular videos. To constrain the problem, most methods estimate the coefficients of a statistical 3D morphable models (3DMM) in an optimization-based or learning-based framework. Due to the use of over-simplified, mostly linear statistical models, the reconstructed meshes only capture the coarse geometry shape while subtle details are missing. For better generalization to unconstrained conditions, Tewar A et al. in *Fml: Face model learning from videos. In Proc. IEEE Conference on Computer Vision and Pattern Recognition (CVPR)*, 2019. 3, and Tran L et al. in *Towards high-fidelity nonlinear 3d face morphable model. In Proc. IEEE Conference on Computer Vision and Pattern Recognition (CVPR)*, 2019. 3, describe jointly learning a 3D prior and reconstructing 3D faces from images. However, the inventors have identified that the accuracy and quality of the above-mentioned approaches is not suitable for applications that require metrically accurate geometry.

Further, the inventors have recognized that inferring 3D geometry from a single image is an ill-posed problem due to the ambiguity of focal length, scale and shape as under perspective projection different shapes result in the same image for different object-camera distances.

In order to at least partially address some of the above-mentioned disadvantage, a volumetric sampling based method is described herein for generation of topologically consistent meshes across facial identities and expression using a volumetric representation. In one example, a method, comprises: receiving, at one or more processors, a plurality of images of the subject or the object, each of the plurality of the images comprising a different view of the subject or the object; generating, via the one or more processors, a three-dimensional initial coarse mesh based on the plurality of images according to a global volumetric feature sampling algorithm; generating, via the one or more processors, a three-dimensional final base mesh of the subject or the object; generating, via the one or more processors, an image rendering of the subject or the object based on the three-dimensional final base mesh; and displaying, via a display portion of a user interface communicatively coupled to the one or more processors, one or more of the initial coarse mesh, the final base mesh, and the image rendering; wherein generating the three-dimensional final base mesh comprises iteratively upsampling starting from the initial coarse mesh to generate a series of intermediate meshes with increasing mesh density.

In another embodiment, a method comprises: receiving one or more of a set of multi-view images including a subject or an object and corresponding set of camera calibration parameters for each multi-view image; generating, according to a progressive mesh generation model, a three-dimensional final mesh of the subject or the object or a portion thereof; and displaying the three-dimensional final mesh of the subject or the object or the portion thereof via an output device. In one example the progressive mesh generation model comprises a global stage model and a local stage model, wherein the global stage model is configured to generate an initial coarse mesh from the set of multi-view images; wherein the local stage model is configured to generate a final base mesh from the initial coarse mesh in a iterative manner through two or more iterations, each iteration comprising one or more of local volumetric sampling, upsampling to increase a number of vertices progressively, and refinement for updating vertex positions in an upsampled mesh; wherein generating the final base mesh comprises iteratively generating a series of intermediate meshes, each successive intermediate mesh having a greater number of vertices than a previous intermediate mesh and less than the final number of vertices of the final base mesh.

In this way, the final mesh is progressively generated through a number of iterations from the initial coarse mesh. The progressive mesh generation model includes a global stage method to generate the initial coarse mesh and a local stage method to generate the final base mesh from the initial coarse mesh in an iterative manner. Further, the progressive mesh generation model includes volumetric feature sampling and/or refinement models for topologically consistent 3D mesh reconstruction from multi-view image. By employing volumetric sampling, and iterative upsampling and refinement, the progressive mesh generation model combines geometry and correspondence accuracy, while achieving mesh inference at near interactive rates. Further, the progressive mesh generation model described herein produces meshes that tightly fit the ground truth surfaces. The progressive mesh generation model provides significant improvement in speed and accuracy for high resolution mesh generation, generation of one or more asset maps (e.g., albedo, displacement, geometry, texture, specular reflectance maps, etc.) that may be used in downstream rendering processes.

A technical advantage of the volumetric sampling based method for 3D mesh generation includes generation of meshes in dense vertex correspondence. Further, the volumetric sampling based method generates dense and more accurate mesh predictions in a consistent mesh topology. Another technical advantage of the method for 3D mesh generation is reconstruction of 3D geometry with increased metric accuracy by leveraging explicit calibrated multi-view information. Yet another technical advantage of the methods for 3D mesh generation based on volumetric sampling includes significantly improved mesh generation speed. As demonstrated below under experimental data, the methods described herein takes calibrated multi-view images as input and directly outputs a high-quality mesh in dense vertex correspondence in 0.385 seconds. Additionally, using the volumetric sampling method described herein, a 3D mesh may be obtained with stable reconstruction and registration results for sequence input.

System

FIG. 1A is a block diagram illustrating a computing system 100 configured to implement one or more aspects of the embodiments described herein. The computing system 100 includes one or more processor(s) 142 and a memory 120 communicating via an interconnecting bus 105. In some examples, the interconnecting bus may include a memory hub (not shown), which may be a separate component within a chipset or may be integrated within the one or more processor(s) 102. The computing system 100 further comprises an I/O subsystem 104 that may enable the computing system 100 to receive input from one or more I/O device(s) 154. Additionally, the I/O subsystem 104 is communicatively coupled to one or more display device(s) and the I/O subsystem 104 may be configured to enable a display controller, which may be included in the one or more processor(s) 142, to provide outputs to one or more display device(s) 152. In one embodiment, the one or more display device(s) 152 may include a local, internal, or embedded display device.

In one example, the one or more display device(s) 152 may be a monitor for displaying information and images to users. The I/O device(s) 154 may be devices that receive various inputs from a user and provide various outputs to the user, and may include a keyboard, a remote controller, a mouse, a printer, audio input/output devices, and so forth.

In one embodiment, the computing device 100 further includes one or more graphical processing unit(s) 144. In one embodiment, the one or more GPU(s) 144 form a graphics processing subsystem that can output pixels to one of the one or more display device(s) 152 coupled via the I/O subsystem 104. The one or more GPU(s) may also include a display controller and display interface (not shown) to enable a direct connection to other one or more display device(s) (not shown). Communication paths interconnecting the various components in FIG. 1A may be implemented using any suitable protocols, such as PCI (Peripheral Component Interconnect) based protocols (e.g., PCI-Express), or any other bus or point-to-point communication interfaces and/or protocol(s), such as the NVLink high-speed interconnect, or interconnect protocols known in the art.

Further, the one or more GPU(s) 144 may execute instructions suitable for enabling the functions described herein. In particular, the one or more GPU(s) 144 may be used in connection with particular image-related operations which the one or more GPU(s) 144 are uniquely suited to perform. Further, in some embodiments, the one or more GPU(s) 144 may be configured for the purpose of processing visual data, particularly vector and shading, and performs faster memory operations and access, along with performing specialized lighting operations. In various implementations, the instruction sets and memory in the one or more GPU(s) 144 may be configured for operation upon graphical data. In this way, the one or more GPU(s) 144 may be configured for operation upon the image data or to quickly and efficiently performing the mathematical operations described herein. The one or more graphics processing units may be configured in a so-called multi-core format, or linked by a bus or other connection that may together be applied to a single set of or to multiple processing operations.

The I/O subsystem 104 includes a communication interface 106 configured to provide an interface mechanism to enable connections between the computing device 100 and other components, such as a server or an edge device, via a communications network. The computing device 100 may also include one or more communication interfaces for exchanging data with other devices, such as via a network, direct connection, or the like, as discussed above. The communication interfaces can facilitate communications within a wide variety of communication networks and/or protocol types, including wired networks (e.g., LAN, cable, etc.), wireless networks (e.g., WLAN, cellular, satellite, etc.), the Internet, or a combination thereof. Communication interfaces can also provide communication with external storage (not shown), such as in a storage array, network attached storage, storage area network, or a combination thereof.

In various embodiments the computing system 100 including the one or more processors 142 and the one or more GPU(s) 144 may be a single/dual processor desktop system, a multiprocessor workstation system, or a server system having a large number of processors 142 or processor cores. In one embodiment, the system 100 is a processing platform incorporated within a system-on-a-chip (SoC) integrated circuit for use in mobile, handheld, or embedded devices.

In some embodiments, the computing system 100 may be a server-based gaming platform, a game console, including a game and media console, a mobile gaming console, a handheld game console, or an online game console. In some embodiments computing system 100 is a mobile phone, smart phone, tablet computing device or mobile Internet device. In various embodiments, the computing system 100 can also include, couple with, or be integrated within a wearable device, such as a smart watch wearable device, smart eyewear device, augmented reality device, or virtual reality device.

In some embodiments, the one or more processors 142 each include one or more processor cores to process instructions which, when executed, perform operations for system and user software. Among other capabilities, the one or more processor(s) 142 may be configured to fetch and execute computer-readable instructions stored in the memory 120, mass storage devices, or other computer-readable media.

Memory 120 is an example of computer storage media for storing instructions which are executed by the one or more processor(s) 142 to perform the various functions described below. For example, memory 120 may generally include both volatile memory and non-volatile memory (e.g., RAM, ROM, or the like). Further, mass storage devices (not shown) may generally include hard disk drives, solid-state drives, removable media, including external and removable drives, memory cards, flash memory, floppy disks, optical disks (e.g., CD, DVD), a storage array, a network attached storage, a storage area network, or the like. Both memory 120 and mass storage devices may be collectively referred to as memory or computer storage media herein, and may be a non-transitory media capable of storing computer-readable, processor-executable program instructions as computer program code that can be executed by the processor 142 as a particular machine configured for carrying out the operations and functions described in the implementations herein.

Memory 120 may store a pre-processing module and image data (not shown). The pre-processing module may be configured to process one or more images received as input, via the I/O devices 154, for example, and/or from a database storing the image data. As an example, the pre-processing module may be configured to generate one or more calibrated images using one or more input images and corresponding camera calibration parameter.

Memory 120 may store a base mesh generation logic 121. The base mesh generation logic 121 includes a 2D feature extraction network 122, a volumetric feature sampling logic 123, a probability volume generation logic 124, and an upsampling and refinement logic 125. As used herein, the term "logic" refers to computer program logic used to provide the specified functionality. Thus, logic can be implemented in hardware, firmware, and/or software. In one embodiment, logic is stored in a permanent storage, loaded into random access memory, and executed by a processor. The base mesh generation logic 121 is configured to generate a final base mesh of a subject or an object at high-resolution using at least two images of the subject as input. Additionally, in some examples, the base mesh generation logic may be configured to process the at least two images of the subject or the object according to one or camera parameters for each image to generate calibrated images that are then used as inputs into a progressive mesh generation network for base mesh generation. The 2D feature extraction network 122 may be a trained neural network that is trained to receive the at least two images or corresponding calibrated images, and output one or more 2D feature maps for each input image. The volumetric feature sampling logic 123 is configured to generate a feature volume within a 3D grid. In one example, sample volumetric features may be generated by bilinearly sampling and fusing image features at projected coordinates in all images for each local point the 3D grid. The probability volume generation logic 124 includes a global geometry network trained to receive the feature volume as input and output a probability volume comprising a plurality of channels. Each channel in the plurality of channels encodes a corresponding probability distribution for a corresponding location of a corresponding vertex in an initial mesh (that is, initial coarse mesh, which is also indicated as $M_0$ below). In one example, the global geometry network is a 3D convolutional network having a U-net architecture with skip connections. In some embodiments, a global stage model may include the 2D feature extraction network 122, the volumetric feature sampling logic 123, and the probability volume generation logic 124. Accordingly, the global stage model may be configured to generate the initial coarse mesh from the at least two input images.

The upsampling and refinement logic 125 may be configured to generate the final base mesh from the initial coarse mesh. For example, the three-dimensional base mesh may be generated from the initial coarse mesh by iteratively upsampling and refining a plurality of vertices, starting from the initial coarse mesh to generate a series of intermediate meshes, each successive intermediate mesh having a greater number of vertices than a previous intermediate mesh and less than a final number of vertices of the final base mesh. The upsampling and refinement logic 125 comprises a local refinement network, which is implemented for refining vertex positions of an upsampled mesh during upsampling and refinement. The local refinement network may take a local feature volume as input and output a per-vertex probability volume corresponding to each vertex position. In one example, the local refinement network is a 3D convolutional network with skip connections. In some embodiments, a local stage model may include the upsampling and refinement logic 125. Accordingly, the local stage model may be configured to generate the final base mesh in iteratively from the initial coarse mesh. Thus, in some embodiments, the base mesh generation logic may include the global stage model and the local stage model.

Memory 120 may further include a map generation logic 126 comprising a synthesis network. The map generation logic 126 may be configured to generate one or more asset maps, including but not limited to an albedo map, a geometry map, a specular reflectance map, a displacement map, and/or a normal map from the final base mesh and the at least two input images. The one or more asset maps may be used in rendering pipeline for rendering one or more images, such as a photo-realistic image.

Memory 120 may further store a rendering module 128 that includes instructions for rendering photo-realistic images based on the base mesh and the one or more asset maps.

Memory 120 may further store training module 130, which comprises instructions for training one or more neural network models stored in the base mesh generation logic 121 and the map generation logic 126. In some embodiments, training module 130 includes instructions for implementing one or more gradient descent algorithms, applying one or more loss functions, and/or training routines, for use in adjusting parameters of the one or more neural network models of the base mesh generation logic 121 and the map generation logic 126. In at least one embodiment, training module 130 can select an appropriate model or neural network to be used, if not specified by the request, and can train a model using relevant training data.

Memory 120 also stores an inference module 132 that comprises instructions for validating and testing new data with the one or more trained neural network models.

In some embodiments, the memory 120 may include components disposed at two or more devices, which may be remotely located and/or configured for coordinated processing. In some embodiments, one or more aspects of the memory 120 may include remotely-accessible networked storage devices configured in a cloud computing configuration.

The term "module," as used herein generally represents software, hardware, or a combination of software and hardware that can be configured to implement prescribed functions. For instance, in the case of a software implementation, the term "module," can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Figure 1:
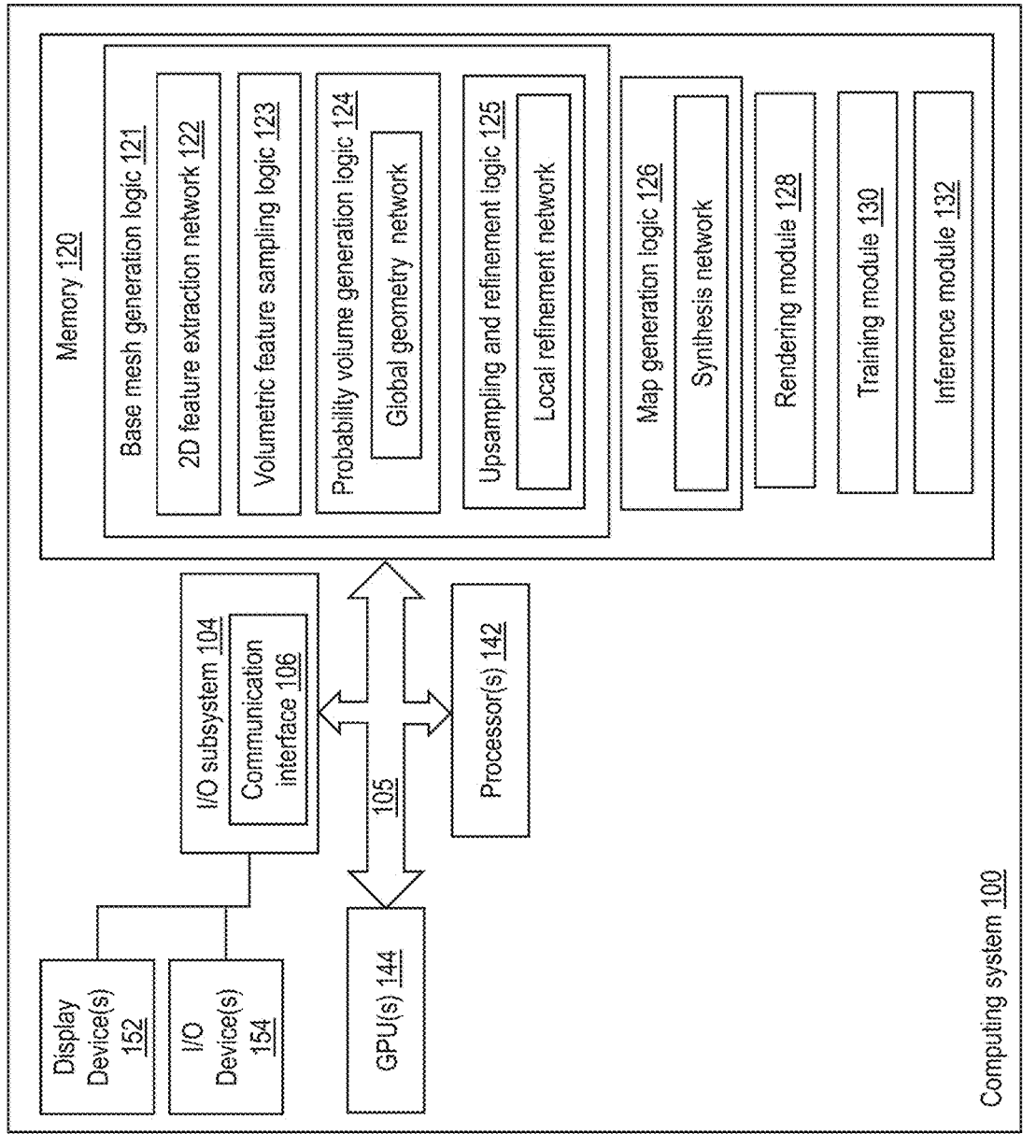
FIG. 1 shows a block diagram of a system for implementing a progressive mesh generation network, according to an embodiment of the present disclosure.

It will be appreciated that the computing system 100 shown herein is illustrative and that variations and modifications are possible. For example, the connection topology, including the number and arrangement of bridges, the number of processor(s) 142, and the number of GPU(s) 144, may be modified as desired. Some of the particular components shown herein are optional and may not be included in all implementations of the computing system 100. For example, any number of add-in cards or peripherals may be supported, or some components may be eliminated. FIG. 1 illustrates an example configuration of a computing system 100 and environment that can be used to implement the modules and functions described herein. In some examples, a computing system, such as a server may include an architecture that is similar to the computing system 100, and may be configured for implementing the progressive mesh generation and/or map generation methods described herein.

Multi-View Mesh Interference

Figure 2:
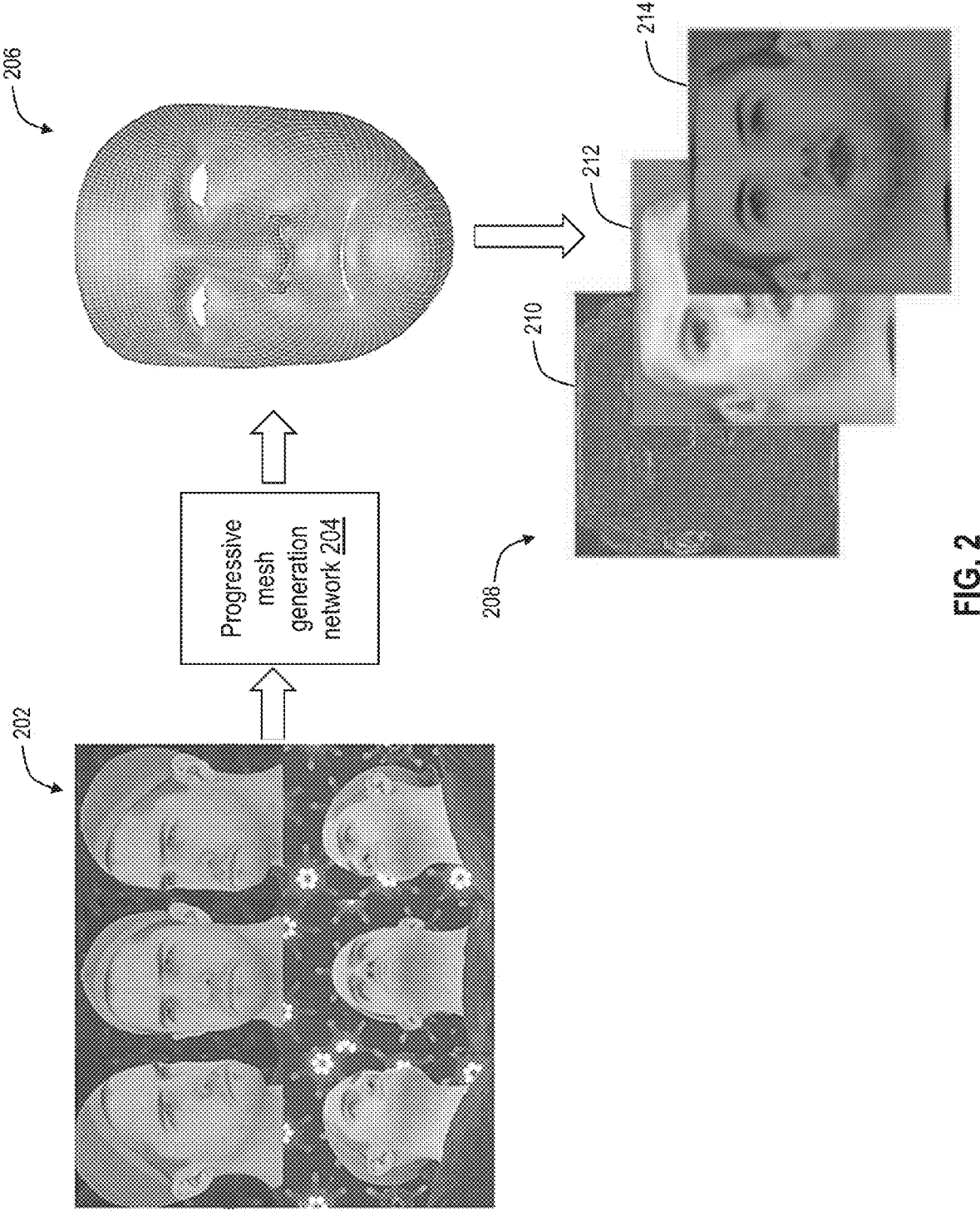
FIG. 2 shows a schematic illustration of a high-level progressive mesh generation framework, according to an embodiment of the present disclosure.

Referring to FIG. 2, it shows a schematic illustration of an overview of a high-level overall framework for performing topology inference of a subject, according to an embodiment. A set of images 202 of the subject, each image showing a different view of the subject at a given pose and/or expression, is used as input into a progressive mesh generation network 204. In one example, the set of images are calibrated images. As discussed below, the mesh inference framework 204 is based on generating volumetric representations globally and locally to infer a 3D base mesh 206 of the subject. The output of the progressive mesh generation network 204 is the 3D base mesh 206 comprising a plurality of vertices. Further, the 3D base mesh is generated with consistent topology. Further, in some examples, the 3D base mesh has a polygon density greater than a threshold density. Optionally, in some examples, based on one or more of the 3D base mesh and the set of input images 202, one or more asset maps 208 may be generated. The one or more asset maps include a displacement map 210, a specular map 212, and an albedo map 214 corresponding to the set of images 202. In some examples, a geometry map on the UV domain may be obtained via texturing of the base mesh 206 and sampling vertex locations instead of RGB colors.

Figure 3A:
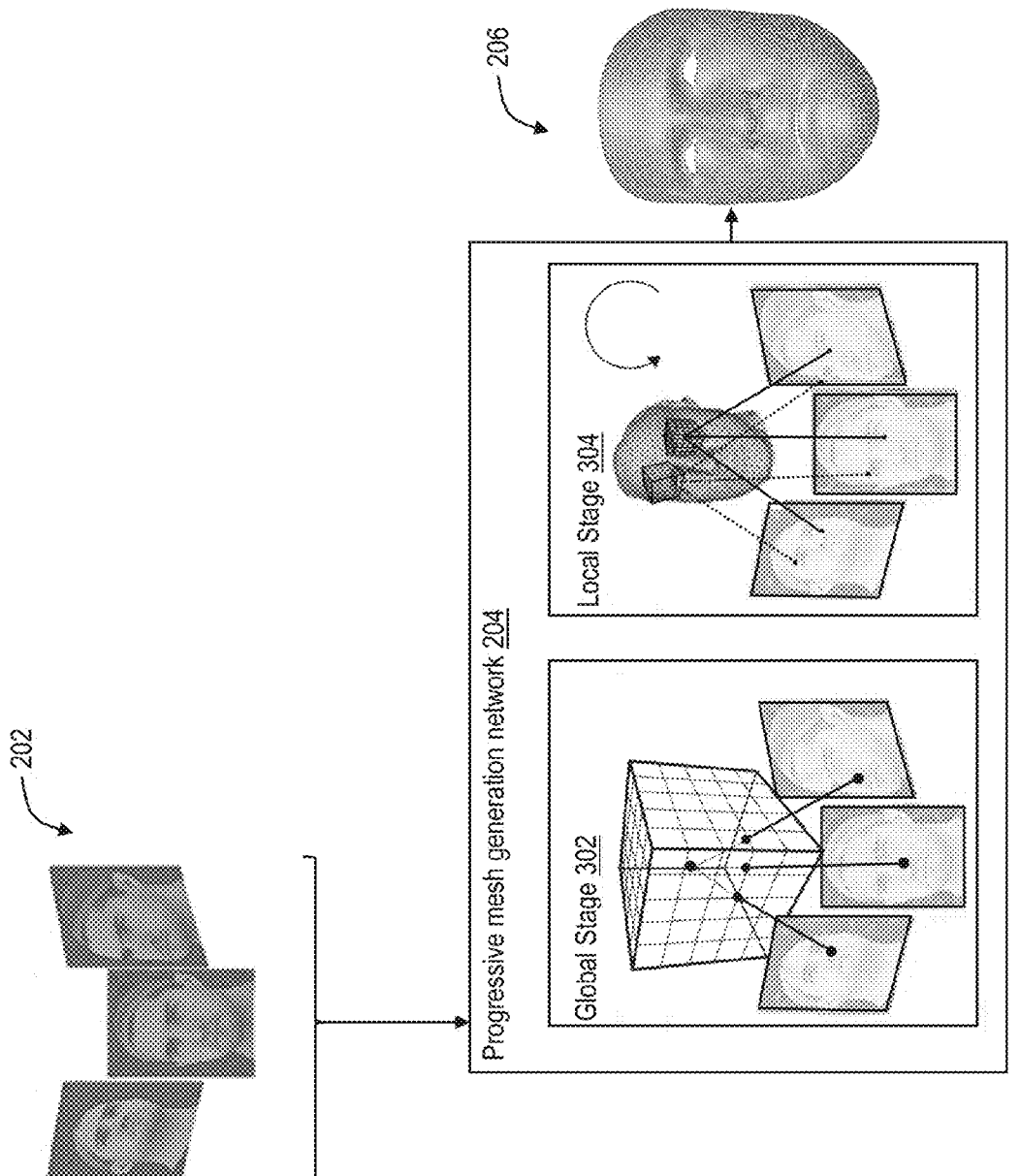
FIG. 3A shows a schematic illustration of a high-level architecture of a progressive mesh generation network, according to an embodiment of the present disclosure.
Figures 3B, 3C:
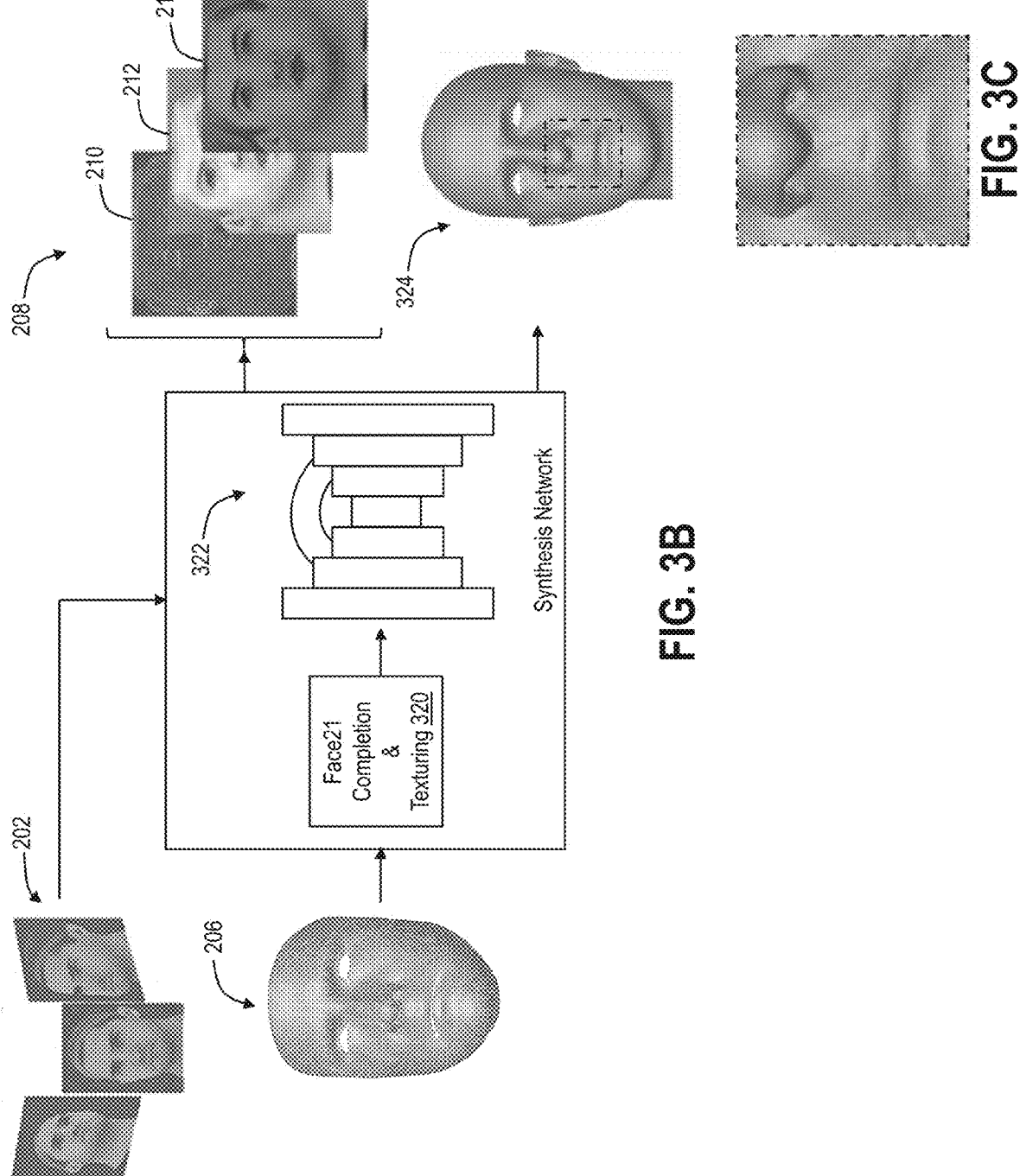
FIG. 3B shows a schematic illustration of a high-level architecture of a skin details and appearance synthesis network, according to an embodiment of the present disclosure.
FIG. 3C shows an enlarged portion of a portion of the detailed mesh in FIG. 3B, according to an embodiment of the present disclosure.

Next, FIG. 3A shows an overview of the progressive mesh generation network 204, and FIG. 3B shows an overview of an appearance and detail capture network, according to various embodiments. Similar or identical features are similarly numbered. As shown in FIG. 3A, given a set of images 202, where the set of images 202 are represented by $\{L\}_{i=1}^{K}$ in K views with known camera calibration $\{Pi\}_{i=1}^{K}$, and together denoted as $I=\{I_i,P_i\}_{i=1}^{K}$, the topology framework may be used: (1) to reconstruct the base mesh 206 in an artist-designed topology, and/or (2) to estimate pore-level geometric details and high-quality facial appearance in form of one or more asset maps, including one or more of albedo and specular reflectance maps. Formally, an output base mesh M contains a list of vertices $V \in R^{N \times 3}$ and a fixed triangulation T. The base meshes are configured to (1) tightly fit the face surfaces, (2) share a common artist-designed mesh topology, where each vertex encodes the same semantic interpretation across all meshes, and (3) have a desired polygon density (e.g., a triangle or quad density with $N > 10^4$ number of vertices).

In order to generate a dense mesh prediction, the inventors herein have developed a coarse-to-fine network architecture, as shown in FIGS. 3A and 3B. The progressive mesh generation network comprises a global stage 302 and a local stage 304. First, the geometry for the base mesh 206 is inferred based on a generation of a coarse mesh at the global stage 302 according to a global coarse mesh prediction logic. The desired semantic mesh correspondence is naturally embedded in the hierarchical architecture, as will be discussed further below. The coarse mesh is indicated by $M_0$ and having a set of vertices $V_0$, such that the global stage $V_0 = F_g(I)$. Further, starting from the coarse mesh $M_0$ and a set of denser meshes $\{M_1, M_2, \ldots, M_L\}$ are generated by iteratively upsampling and refining sparser meshes into the denser meshes $\{M_1, M_2, \ldots, M_L\}$, by the local stage 304, where the for each iteration, a corresponding set of local stage vertices is given by $V_{k+1} = F_l(I, V_k)$, and where $M_L$ is the final prediction of base mesh 206.

In this way, based on the coarse mesh obtained at the global stage 302, the local stage 304 provides "updates" in an iterative manner. In contrast to the two previous approaches of MVS and registration, the global and local stages described herein share consistent correspondence in a fixed topology and use volumetric features for geometry inference as well as surface refinement.

Further, as shown in FIG. 3B, a face completion and texturing 320 is applied on to the base mesh 206 to obtain albedo and geometry maps on the two-dimensional UV domain. Further, synthesis network 322 infers specular reflectance and displacements given both albedo and geometry maps. Further, a detailed mesh 324 in high-resolution may be obtained by applying the displacement map on the base mesh 206. An enlarged portion of a portion of the detailed mesh 324 is shown at FIG. 3C. Further details of the global stage 302, the local stage 304, and the generation of the detailed mesh 324 and the one or more asset maps 218 are described further below with respect to FIGS. 4A-B, 5A-5F, and 6.

Figure 4A:
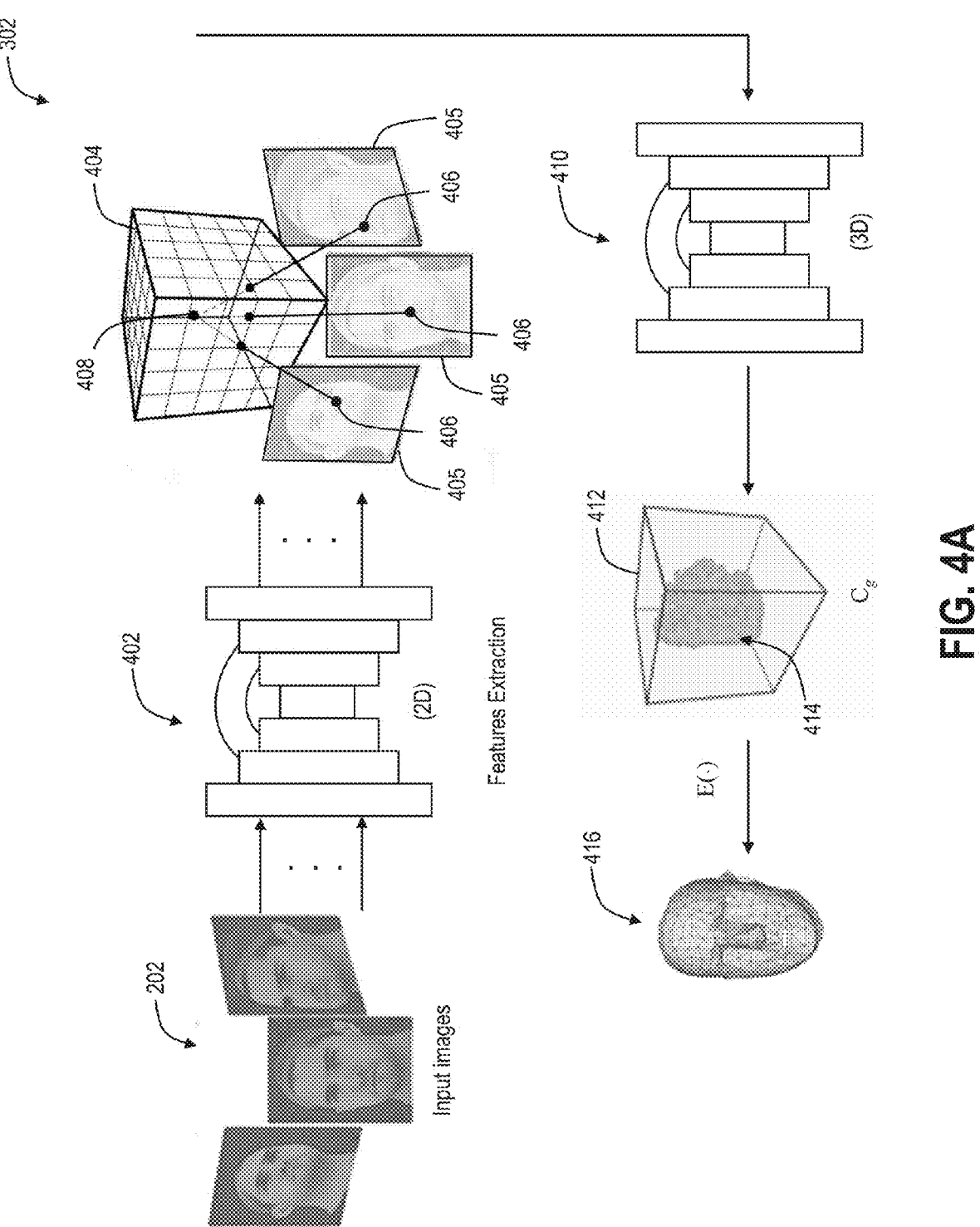
FIG. 4A shows a schematic illustration of a global stage method of a progressive mesh generation network, according to an embodiment of the present disclosure.

FIG. 4A shows a schematic illustration of the global stage method 302 in the progressive mesh generation network 204. The global stage method 302 includes generation of a coarse mesh from a set of input images, according to an embodiment. The global stage method 302 may be implemented by a processor, such as processors 142 and/or 144, according to instructions stored in memory, such as memory 120 shown at FIG. 1. As a non-limiting example, the coarse mesh may be generated according to a base mesh generation logic 121 in memory 120.

Global Geometry Stage

Volumetric Feature Sampling.

In order to extract salient features to predict surface points in correspondence, a shared U-Net convolutional network 402 is utilized to extract local 2D feature maps 405 ($F_i$) for each input image 202 ($I_i$). The volumetric features, indicated by L, are obtained by bilinearly sampling and fusing image features at projected coordinates in all images for each local point $v \in \mathbb{R}^3$ in a 3D grid 404:

$$L(v) = \sigma(\{F_i(\Pi(v, P_i))\}_{i=1}^K), \tag{1}$$

where $\Pi(\cdot)$ is the perspective projection function and $\sigma(\cdot)$ is a view-wise fusion function. In various embodiments, the view-wise fusion function may be max, mean or standard deviation. The 3D grid 404 comprises a set of points. In one example, the 3D grid is a cube grid and is input into a global geometry network 410, which is a 3D convolution network with skip connections. While the 3D grid is a cube grid in this example, the 3D grid 404 may be any shape and the set of point may be chosen at any location. Further, at the global stage 302, the 3D grid 404 is a global grid that covers a whole captured volume for corresponding to a head for the subject in the input images 202. An example of the volumetric feature sampling at a grid location is further demonstrated with respect to FIGS. 5A and 5B. Referring to FIG. 5A it shows a set of images 502 of a subject comprising different views 502a, 502b, 502c, and 502d. FIG. 5B shows a set of feature maps corresponding to the input images. For example, the set of images 502 may be processed via a 2D convolutional neural network, such as the 2D network 402, to generate a set of features maps 505a, 505b, 505c, and 505d corresponding to the input images 502a, 502b, 502c, and 502d. Each input image may be processed via the 2D convolutional network to output one or more corresponding feature maps based on a number of output channels of the 2D network. In order to perform volumetric sampling, feature maps 505a, 505b, 505c, and 505d output from the 2D convolutional network are unprojected into a 3D volumetric grid 504. For example, 2D features f1, f2, f3, and f4, are projected along projection rays into projected coordinates for each point in the grid 504. Thus, volumetric features at each point is a function of corresponding 2D features in the feature maps and camera calibration parameters for each view. After volumetric sampling at the 3D grid 504, the 3D grid is used as input into a 3D convolutional network.

Referring back to FIG. 4A, the volumetrically sampled 3D grid 404 is input into the global geometry network 410. To enable the vertex flexibility, the global geometry network 410 is configured to predict vertex location free of the constraint of 3DMMs. To encourage better generalization, the 3D network is configured to learn, for each vertex, the probabilistic distribution instead of the absolute location.

Global Geometry Network

As discussed above, the 3D grid 304 is configured as a global grid ($\mathcal{G}_g$) that covers the whole captured volume for subject heads. The volumetric feature sampling (Equation 1) is applied on the 3D grid 304 to obtain the global volumetric feature ($L_g$). Further, the global geometry network 410 with skip connections is employed to predict a probability volume 414, where each channel encodes a probability distribution for the location of a corresponding vertex in an initial coarse mesh 416. Indicating the 3D convolutional network as $\Phi_g$, the predicted probability volume may be defined as $C_g = \Phi_g$, ($L_g$), in which each channel encodes the probability distribution for the location of a corresponding vertex in the initial coarse mesh 416 ($M_O$). The vertex locations are extracted by a per-channel soft-argmax operation, $V_0 = \mathbb{E}(C_g)$.

With regard to the $\mathbb{E}$ operator, if B is the batch size and N is the vertex number, given a feature volume Lg from the global volumetric feature sampling, the 3D convolutional network (also referred to herein as global geometry network) predicts a probability volume Cg of size (B, N, 32, 32, 32), whose N-channel is ordered in a predefined vertex order. Finally the soft arg-max operator $\mathbb{E}$ computes the expectations on Cg per channel, and outputs vertices of shape (B, N, 3) corresponding to the predefined order.

Example visualizations for coarse mesh generation is shown at FIGS. 5C-5F. FIG. 5C shows an example feature volume in 3D grid 512 generated based on global volumetric feature sampling on the global grid 512 as discussed above. and FIG. 5D shows an inferred probability volume 514 with respect to the global grid 512 based on a 3D convolutional network, such as the global network 410. Next, FIG. 5E shows a plurality of extracted vertex positions 515 based on the probability volume 514, and FIG. 5F shows an example inferred mesh 517 based on the plurality of extracted vertex positions 515.

Local Geometry Stage

Figure 4B:
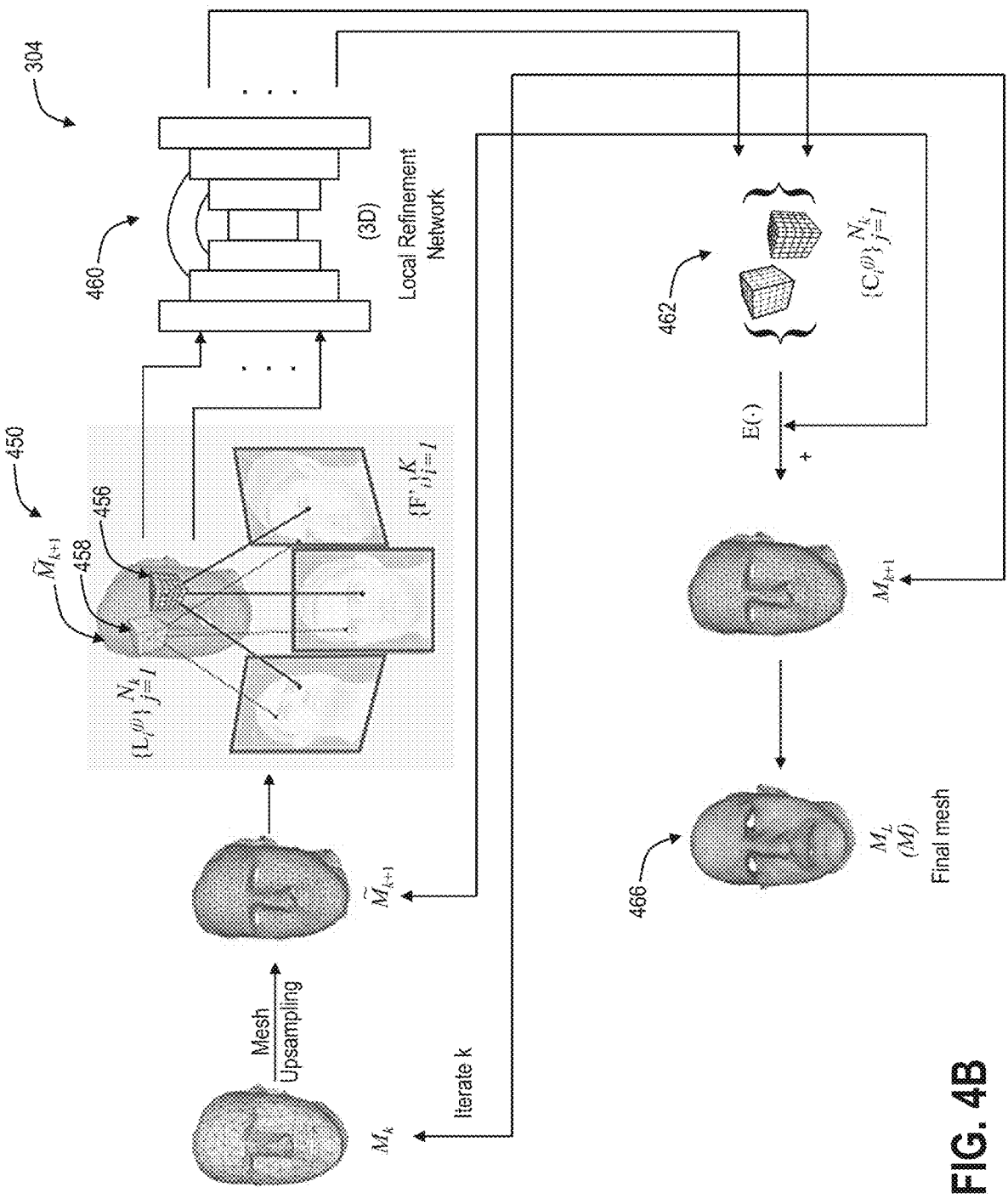
FIG. 4B shows a schematic illustration of a local stage method of a progressive mesh generation network, according to an embodiment of the present disclosure.

Referring to FIG. 4B, it shows a schematic illustration of the local stage 304 process for obtaining a base mesh at a higher resolution from the initial coarse mesh obtained at the global stage 302. A mesh at a lower resolution (that is, a sparser mesh) is indicated by $M_k$. At the beginning of the local stage, $M_k$ is the coarse mesh 416 obtained at the global stage 302. First, the sparser mesh is upsampled to generate an upsampled mesh $\tilde{M}_{k+1}$. Further, a local volumetric feature sampling is performed on the upsampled mesh $\tilde{M}_{k+1}$, as indicated at 450 in FIG. 4B. In order to perform local volumetric sampling, around each vertex of the upsampled mesh $\tilde{M}_{k+1}$, a local volumetric grid is generated. In this example at FIG. 4B, local grids 456 and 458 are shown. Thus, a plurality of local volumetric grids, each local grid corresponding to a vertex in the upsampled mesh, is generated. The plurality of local volumetric grids are input into a local refinement network 460 to generate a plurality of probability volumes, each probability volume corresponding to the local volumetric grid. Thus, the output of the local refinement network comprises a per-vertex probability volume.

Starting with the coarse mesh $M_O$ obtained from the global stage, the local stage progressively produces meshes in higher resolution and with finer details, $\{M_k\}_{k=1}^L$. At each level k, this process is done in two steps, as shown in FIG. 6 (1) a fixed and differentiable upsampling operator to provide a reliable initialization for upsampled meshes, and (2) a local refinement network to further improve the surface details based on the input images.

Upsampling

A previous approach for mesh upsampling relies on a barycentric embedding of vertices in the lower-resolution mesh version. However, the inventors have recognized that direct reliance on barycentric embedding alone results in unsmooth artifacts, as the barycentric embedding constrains the upsampled vertices to lie in the surface of the lower-resolution mesh. Instead, herein, additional normal displacement weights are used as shown in at 602 in step 1 of FIG. 6. Given a sparser mesh $M_k = (V_k, T_k)$ and its per-vertex normal vectors $N_k$, the mesh is upsampled by based on additional normal displacement weights. The vertices are upsampled by:

$$\tilde{V}_{k+1}=Q_kV_k+D_kN_k, \tag{2}$$

where $Q_k \in \mathbb{R}^{N_{k+1} \times N_k}$ is the barycentric weight matrix and $D_{k-1} \in \mathbb{R}^{N_{k+1} \times N_k}$ is the additional coefficient matrix that apply displacement vectors along normal directions. The normal displacements encode additional surface details that allow vertices to be outside of the input surface.

For a hierarchy with L levels, the full-resolution template mesh T=(V, T): $=T_L$ is first downsampled by isotropic remeshing and non-rigid registration, into a series of meshes with decreasing resolution while still preserving geometry and topology of original mesh: $\{T_{L-1}, T_{L-2}, \ldots, T_0\}$. Next, the vertices are embedded at higher resolution in the surface at lower resolution meshes by barycentric coordinates $Q_ka$. The remaining residual vectors re then projected onto the normal direction and obtain $D_k$.

Local Refinement Network.

Around each vertex (indexed with j) of the upsampled mesh $\tilde{V}_{k+1}^{(j)}$, a smaller grid is defined than $G_g$ in the global stage in the local neighborhood $G_l^{(j)}$ The local volumetric features $L_l^{(j)}$ are sampled by Eq. 1. For each local feature volume, a local refinement network 460, which is a 3D convolutional network with skip connections is used to predict per-vertex probability volume. If the local refinement network 460 is indicated by $\Phi_l$, the per vortex probability volume is provided by $C_l^{(j)}=\Phi_l(L_l^{(j)})$. Then a corrective vector is computed by an expectation operator, $\delta V_{k+1}^{(j)}=\mathbb{E}(C_l^{(j)})$. This process is applied to all vertices independently, and therefore can be parallelized in batches. The upsampled and refined mesh vertices are given by:

$$V_{k+1}=\tilde{V}_{k+1}+\delta V_{k+1} \tag{3}$$

Given the base mesh $\mathcal{M}_O$, the local stage is iteratively applied at all levels until a desired resolution is reached and obtain $\mathcal{M}_L$.

The volumetric feature sampling and the upsampling operator, along with the networks are fully differentiable, enabling the progressive geometry network end-to-end trainable from input images to dense registered meshes.

Appearance and Detail Capture

One or more asset maps, such as normal maps, texture maps, displacement maps, albedo maps, etc. are used as inputs into a physically-based rendering pipeline for achieving photo-realistic rendering, which is often difficult to estimate. Previous approaches rely on special capture hardware, such as the Light Stage capture system. The inventors herein provide a method for generation of one or more asset maps without depending on appearance capture systems, such as light stage capture systems. In one example, a method, comprises: generating a base mesh based on global and local volumetric feature sampling; performing texturing on the base mesh and using a plurality of multi-view images to obtain an albedo reflectance map in the UV domain. The method further comprises sampling vertex locations to obtain a geometry map.

Albedo Maps Generation.

The base meshes are reconstructed for a smaller head region. In one example, a base mesh may be augmented by additional fitting for the back of the head using Laplacian deformation. After base mesh augmentation, texturing may be performed on the completed mesh and multi-view images, and an albedo reflectance map on the UV domain may be generated. Furthermore, by applying the texturing process and sample vertex locations instead of RGB colors, another map on the UV domain, a geometry map, may be obtained.

Detail Maps Synthesis.

To further augment the representation, an image-to-image translation strategy is utilized to infer finer-level details. A synthesis network, such as synthesis network 322, may be trained to infer specular reflectances and displacements given both albedo and geometry map. All the texture maps may then be upscaled to 4K resolution according to a super resolution strategy. Example super resolution approach is described in Wang et al. *Enhanced super-resolution generative adversarial networks. In The European Conference on Computer Vision Workshops (ECCVW)*, September 2018, which is incorporated by reference herein in its entirety.

Upon obtaining a displacement map, a detailed mesh may be generated by applying the displacement map on the base mesh. The reconstructed skin detail and appearance maps are directly usable for standard graphics pipelines for photo-realistic rendering. In this way, high-resolution detail and appearance maps may be obtained without the dependency on special appearance capture systems. In particular, an example reconstruction pipeline (i.e. base mesh reconstruction and appearance and detail capture) enables reconstruction of a 3D face with high-quality assets, 2 to 3 orders of magnitude faster than existing methods, which can readily be used for photorealistic image rendering. An example full model rendering with inferred normal displacements, and additional albedo and specular maps are shown at FIG. 12.

Turning to FIG. 7A, it shows a flow chart illustrating a high-level method 700 for generating a three-dimensional base mesh of a subject or a portion thereof (e.g., a face), according to an embodiment. Method 700 and other methods described herein may be implemented by one or more processors, such as processor(s) 142 and/or processor(s) 144, according to instructions stored in memory, such as memory 120, of a computing device. It will be appreciated that the method 700 and other methods described herein may be implemented by other systems, such as a server, an edge device, either independently or in combination with the computing device, without departing from the scope of the disclosure.

At 702, the method 700 includes receiving a set of images of the subject at a given pose and/or expression, wherein each image corresponds to a different view. The set of images may be acquired via a capture system (e.g., a camera), for example, and received via an input device of the computing device communicatively coupled to the capture system. In some examples, the set of images may be stored in a database of the computing device or another database communicatively coupled to the computing device, and input into a progressive mesh generation model for generation of a high-resolution base mesh. In some other examples, the set of images may be based on a video frame. In still further example, the set of images may be generated from a single image, such as a perspective image of the subject. The progressive mesh generation model described herein is configured to generate high-resolution base meshes even with few image views (see FIG. 13A, for example). Accordingly, a number of images in the set of images may be 2, 3, 4, 5, 6, 7, 8, 9, 10, 11, 12, 13, 14, 15 or more images. Additionally, at 702, the method 700 further includes receiving a set of camera calibration parameters for each image in the set of images.

At 704, the method 700 includes generating a coarse mesh having a first number of vertices based on the set of input images and according to global volumetric feature sampling.

The global volumetric feature sampling is described at FIG. 7B. Briefly, 2D features extracted from the set of input images are unprojected onto a global 3D volumetric grid covering an entirety of the subject or the portion of the subject for which the base mesh is generated. Further, a probability volume is inferred from a volumetric feature map generated within the 3D grid based on the 2D features via a global geometry network, such as the global geometry network 410. The probability volume comprises a plurality of channels, wherein each channel encodes a probability distribution for a location of a corresponding vertex in the coarse mesh. The coarse mesh is then generated based on extracted vertices from the probability volume.

At 706, the method 700 includes generating a base mesh with a final number of vertices from the coarse mesh, wherein the final number of vertices is greater than the first number of vertices of the base mesh. The base mesh is generated by iteratively upsampling and refining the vertex positions to obtain a series of intermediate meshes, each having progressively greater number of vertices than the previous mesh, as discussed below at FIG. 7C.

Upon obtaining the base mesh, at 708, the method 700 optionally includes displaying one or more of the coarse mesh, one or more intermediate meshes, and the final base mesh. Alternatively or additionally, the one or more of the coarse mesh, one or more intermediate meshes, and the final mesh, may be stored in a storage device (e.g., a memory disk) that may be part of the computing device and/or communicatively coupled to the computing device.

Next, at 710, the method 700 includes generating one or more of a three-dimensional detailed mesh, and one or more asset maps, including one or more of an albedo map, a geometry map, a displacement map, a specular reflectance map, based on the base mesh. The details of generating one or more of the detailed mesh, skin detail map, and the appearance map will be described below at FIG. 7D.

Next, at 712, the method 700 includes generating one or more of an animated rendering, a photo realistic rendering, a virtual avatar rendering, an augmented reality rendering based on one or more of base mesh, detailed mesh, and the one or more asset maps. An example detailed mesh and a photo realistic rendering of a subject's face using the progressive mesh network from a set of input images is shown at FIG. 12. In particular, a high-resolution base mesh is shown at 1202, a detailed mesh is shown at 1204, and a photo realistic rendering with full attributes is shown at 1206. Based on the reliable base meshes generated via the progressive mesh generation method, the appearance and detail capture network predicts realistic face skin details and attributes, without special hardware such as light Stage, enabling photo-realistic rendering.

Referring next to FIG. 7B, it shows a flowchart illustrating a high-level method 720 for generating the coarse mesh, according to an embodiment.

At 722, the method 720 includes receiving the set of images, each image corresponding to a different view. Step 722 is similar to 702, and thus, the details will not be repeated. Next, at 724, the method 720 includes extracting one or more 2D feature maps for each input image. In one example, a 2D convolutional network, such as 2D network 402 may be employed to extract one or more 2D feature maps. In one example, the 2D convolutional network may be a shared U-Net convolutional network.

At 726, the method 720 includes generating a feature volume by performing volumetric feature sampling in a global 3D grid based on bilinear sampling and fusing projected image features at each point in the global grid. In particular, a global 3D grid is selected, such as 3D grid 404 or 512, wherein the global 3D grid is configured such that projected volumetric features of an entirety of the subject or a portion of the subject may be positioned within the 3D grid. Said another way, the 3D grid is configured to cover the whole captured volume of the subject or the portion thereof. Further, the volumetric feature sampling is performed by bilinearly sampling and fusing image features at projected coordinates in all images for each local point in the 3D grid. The volumetric feature sampling comprises projecting a set of 2D features via corresponding projection rays into projected coordinates for each point in the 3D grid. For example, for a given point in the 3D grid, corresponding 2D feature from each feature map view is fused at the projected coordinates. Thus, volumetric features with respect to each point in the 3D grid is a function of corresponding 2D features in the feature maps and camera calibration parameters for each view. After volumetric sampling at the 3D grid 504, the 3D grid is used as input into a 3D convolutional network.

Example illustrations of the volumetric feature sampling are shown at FIG. 4A (volumetric sampling at grid 404), and FIGS. 5A and 5B. the 3D grid volume comprises a set of points in a grid, wherein the set of points may be at any location within the grid volume and any shape. In one example, the 3D grid volume is a cube. It will be appreciated that other volumes (e.g., rectangular cuboid, cylindrical, conical, spherical, triangular prism, pyramidal, non-geometric, etc.) may be employed and are within the scope of the disclosure.

Next, at 728, the method 720 includes generating a probability feature volume via a global geometry network, such as global geometry network and using the feature volume obtained at 726 as input. In one example, the global geometry network is a 3D convolutional network with skip connections, trained to predict a probability volume in which each channel encodes the probability distribution for the location of a corresponding vertex in an initial coarse mesh.

Next, at 730, the method 720 includes generating the coarse mesh comprising a first set of vertices based on the inferred probability volume at 728. This includes, extracting vertex locations from the inferred probability volume. Details of extracting vertex locations are described above at FIG. 4A.

At 732, the method 720 includes inputting the coarse mesh into a local stage process as discussed below at FIG. 7C.

FIG. 7C is a flow chart illustrating a high-level method 740 for generating the final base mesh having a final number of vertices from the coarse mesh generated at the global stage process.

At 742, the method 740 includes performing mesh upsampling on the 3D grid based on barycentric weight matrix and displacement vectors along normal directions. The upsampling is described above with respect to FIGS. 4B and 6. Upsampling includes applying a fixed and differentiable upsampling operator to provide a reliable initialization for upsampled meshes. In particular, the normal displacements encode additional surface details that allow vertices to be outside of the input surface, which reduces unsmooth artifacts.

At 744, the method 740 includes generating a plurality of local probability volumes by inferring per-vertex probability volume via a local refinement network, such as network 460, for each local volume. Generating the plurality of local probability volumes comprises around each vertex of the upsampled mesh from step 742, generating a local 3D grid, where the local 3D grid is smaller than the global 3D grid used in the global stage. Further, local volumetric features with respect to each local grid is sampled to generate a plurality of local feature volumes. In one example, equation 1 is used for sampling volumetric features. Further, the plurality of local feature volumes, are input in to the local refinement network, which as discussed above with respect to FIGS. 4B and 6 is a 3D convolutional network with skip connections, to generate the plurality of local probability volumes.

Next, at 746, the method 740 includes generate upsampled and refined mesh based on the plurality of local probability volumes and a corresponding corrective vector for each vertex. For example, the corrective vector is determined based on an expectation operator on the corresponding local volume. An upsampled and refined mesh is then generated based on the plurality of local probability volume and the corresponding corrective vector. If the upsampled and refined mesh has a mesh density less than a final desired mesh density, then the upsampling and refinement process (that is from steps 742 to 746) is repeated until the desired mesh density is reached. Accordingly, at 748, the method 740 includes performing further mesh upsampling on the upsampled and refined mesh, and performing further mesh refinement until desired higher resolution base mesh is obtained. That is, the local stage process is iteratively applied until the desired mesh density is achieved. The final mesh thus obtained is the base mesh.

In this way, dense meshes are generated via the global stage process and the local stage process. Further, the volumetric feature sampling and the upsampling operator, along with the networks are fully differentiable, enabling the progressive geometry network end-to-end trainable from input images to dense registered meshes.

FIG. 7D is a flow chart illustrating a high-level method 760 for generating one or more asset maps, according to an embodiment.

At 762, the method 760 includes receiving a set of input images, each image corresponding to a different view, and a set of corresponding camera calibration parameters. Step 762 is similar to step 702. Then, at 764, the method 760 includes receiving a generated base mesh, where the base mesh is generated using a progressive mesh generation network including a global stage process and a local stage process, as discussed above at FIGS. 7B and 7C.

Next, at 766, the method 760 includes generating an albedo and/or a geometry map based on the set of input images and the base mesh. In one example generating the albedo map comprises applying texturing using the base mesh and the multi-view images to obtain the albedo map on the UV domain. Further, the method 760 includes applying the texturing process based on the base mesh and the input multi-view images, and sampling vertex locations instead of RGB colors to obtain a geometry map.

Next, at 768, the method 760 includes generating a specular reflectance map and/or a displacement map based on the albedo and geometry maps. In one example, a synthesis network, such as synthesis network 322, is implemented to generate the specular reflectance and displacement map. All the texture maps are then upscaled to a higher resolution (e.g., 4K).

Next, at 770, the method 760 includes generating detailed mesh in high-resolution by applying the displacement map on the base mesh.

Next, at 772, the method 760 includes rendering a photo-realistic image based on the detailed mesh and the one or more asset maps, including albedo, geometry, displacement, and specular reflectance map. In various examples, one or more of an animated rendering, a photo realistic rendering, a virtual avatar rendering, an augmented reality rendering may be generated based on one or more of base mesh, detailed mesh, and the one or more asset maps.

Experimental Data

The following set of experimental data is provided to better illustrate the claimed invention and is not intended to be interpreted as limiting the scope.

Datasets

The volumetric sampling method is evaluated on datasets captured from the Light Stage system, with 3D scans from MVS, ground truth base meshes from a traditional mesh registration pipeline, and ground truth skin attributes from the traditional light stage pipeline. In particular, the ground truth base meshes (registrations) are corrected with optical flow and manual work of a professional artist, to ensure high quality and high accuracy of registration. The dataset comprises 64 subjects (45 for train and 19 for test), covering wide diversities in gender, age and ethnicity. Each set of capture contains a neutral face and 26 expressions, including some extreme face deformations (e.g. mouth widely open), asymmetrical motions (jaw to left/right) and subtle expressions (e.g. concave cheek or eye motions).

Implementation Details

For a progressive mesh generation network (e.g., progressive generation network 204) comprising a global stage method (e.g., global stage method 302) and a local stage (e.g., local stage method 304), a feature extraction network adopts a pre-trained UNet with ResNet34 as its backbone, which predicts feature maps of half of resolution of input image with 8 channels. The volumetric features of the global stage are sampled from a $32^3$ grid with grid size of 10 millimeters, the local stage uses a $8^3$ grid with a grid size of 2.5 millimeters. The grids for the volumetric feature sampling is randomly rotated as data augmentation during training. The mesh hierarchy with L=3 contains meshes with 341, 1194, 3412 and 10495 vertices. Both the global geometry network (e.g. global geometry network 410) and local refinement network (e.g., local refinement network 460) employ a V2V network. An example V2V architecture is described in Iskakov et al. *Learnable triangulation of human pose. In Proceedings of the IEEE International Conference on Computer Vision*, pages 7718-7727, 2019, which is incorporated by reference herein in its entirety. Both stages are trained separately. The global stage trains for 400K iterations with a $I_2$ loss $|V_o - \bar{V}_o\|_2^2$, the local stage trains for 150K iterations with a $I_2$ loss combined across mesh hierarchy levels with equal weights, $\Sigma_{k=o}^{L}\|V_k - \bar{V}_k\|_2^2$, where $\bar{V}_k$ is the ground truth base mesh vertices for the predicted $V_k$ at level k. The progressive mesh generation network is trained using Adam optimizer with a learning rate of 1e-4 and batch size of 2 on a single NVIDIA V100 GPU. For the detail maps synthesis, a conditional generative adversarial network (GAN) architecture is utilized for the synthesis network. An example architecture is shown in Wang et al. *High-resolution image synthesis and semantic manipulation with conditional gans. In Proceedings of the IEEE Conference on Computer Vision and Pattern Recognition*, 2018, which is incorporated by reference herein in its entirety. The global generator and 2 multi-scale discriminators of the synthesis network are trained at resolution of 512×512. A main difference from Wang's architecture is that features are extracted from two inputs separately before concatenating them and feeding into the convolutional back-end so that useful features are better encoded correspondingly. The synthesis network is trained using an Adam optimizer with learning rate of 2e-4 (decayed from 100 epoch) and batch size of 32 on a NVIDIA GeForce GTX1080GPU. For further enhancement, a separate super-resolution network was trained by upsampling attribute maps from 512 to 4K resolution. The super-resolution network is similar to the architecture ESRGAN in Wang X et al. *Esrgan: Enhanced super-resolution generative adversarial networks. In The European Conference on Computer Vision Workshops (ECCVW)*, September 2018, which is incorporated by reference herein in its entirety. The ESRGAN architecture is modified by expanding the number of Residual in Residual Dense Blocks (RRDB) from 23 to 32, enabling the upsampling capacity from 4× to 8× in a single pass. The super-resolution network is trained with learning rate of 1e-4 (halved at 50K, 100K, 200K iterations) and batch size of 16 on two NVIDIA GeForce GTX 1080 GPUs.

Results

Baselines

The performance of the base mesh prediction is compared to the following existing methods: (1) Traditional MVS and Registration: Commercial photogrammetry software Alice-Vision is run, followed by non-rigid ICP surface registration. (2) 3DMM Regression: a network architecture similar to Tewari A et al. *High-fidelity monocular face reconstruction based on an unsupervised model-based face autoencoder. IEEE Transactions on Pattern Analysis and Machine Intelligence*, pages 1-1, 2018, and Tewari A et al. *Self-supervised multi-level face model learning for monocular reconstruction at over 250 hz. In Proc. IEEE Conference on Computer Vision and Pattern Recognition (CVPR)*, pages 2549-2559, 2018. is implemented for a multi-view setting. (3) DFNRMVS: a method that learns an adaptive model space and on-the-fly iterative refinements on top of 3DMM regression. The DFNRMVS is described in Bai Z et al. *Deep facial non-rigid multi-view stereo*. In Proceedings of the IEEE/CVF Conference on Computer Vision and Pattern Recognition, pages 5850-5860, 2020.

As evidenced by the two-step methods of MVS and registration is susceptible to MVS errors and requires manual tweaking optimization parameters for different inputs, which makes it not robust. The progressive mesh generation method described herein shows robustness and generalizability for challenging cases, outperforms existing learning-based method and achieves the state-of-the-art geometry and correspondence quality. Further, the progressive mesh generation method has efficient run-time. Various ablation studies are shown to validate the effectiveness of the progressive mesh network design. In particular, Table 1 below provides example quantitative comparisons to other learning based methods, namely 3DMM regression and DFNRMVS. Further, FIG. 15A shows the cumulative error curves for scan-to-mesh distances among the methods. All methods are evaluated on a common held-out test set with 499 ground truth 3D scans; no data of test subjects are used during training. The geometric reconstruction accuracy is evaluated using scan-to-mesh distance (s2m) that measures the distance between each vertex of a ground truth scan, and the closest point in the surface of the reconstructed mesh. The correspondence accuracy is evaluated using a vertex-to-vertex distance (v2v) that measures the distance between each vertex of a registered ground truth mesh, and the semantically corresponding point in the reconstructed mesh.

TABLE 1

Comparison on geometry accuracy (median s2m), correspondence accuracy (median v2v) among the learning based methods, measured in millimeters.

| Methods | Median s2m | Median v2v |
|---|---|---|
| 3DMM Regression | 2.104 | 3.662 |
| 3DMM regression (PP) | 1.659 | 2.890 |
| DFNRMVS (PP) | 1.885 | 4.565 |
| Progressive mesh generation method | 0.585 | 1.973 |

"PP" denotes the result after a post-processing Procrustes alignment that solves for the optimal rigid pose (i.e. 3D rotation and translation) and scale to best align the reconstructed mesh with the ground truth.
Note that the progressive mesh generation method requires no post-processing.

As evidenced above, the progressive mesh generation outperforms (w/o post-processing) the existing methods (w/ and w/o post-processing) in terms of geometric reconstruction quality and the quality of the correspondence. Note that while the distance of DFNRMVS is higher than for the 3DMM regression, DFNRMVS is visually better in most regions. Their reconstructed meshes tend to have large errors in the forehead and in the jaw areas, as shown in FIG. 8, due to a different mask definition for their on-the-fly deep photo-metric refinement. Referring to FIG. 8, it shows a qualitative comparison on geometric accuracy with the previous methods. In particular, under column 802, a reference scan 804 and a set of input images 806 are shown. Further, columns 804, 806, and 808, 810, each show results obtained with previous methods; and column 810 shows results obtained using the progressive mesh generation method for generating base meshes described herein. Row 812 shows output mesh, row 814 shows overlay of the output mesh with the reference scan, and row 816 shows scan-to-mesh distance. The scan-to-mesh distance is visualized in heat map (red means>5 mm). It may be noted that 3DMM and DFNRMVS need rigid ICP as post-processing. In contrast, the output generated with the progressive mesh generation framework described herein require no post-processing, while outperforming the previous learning-based method in geometry accuracy. Further, FIG. 8 demonstrates that the progressive mesh generation methods described herein produces significantly better reconstructions than DFNRMVS across the entire face.

Robustness

FIG. 9 shows the results from various methods given challenging inputs (column 902). A first mesh generation 910 for a first subject and a second mesh generation 910 for a second subject are shown. Rows 912 and 922 show a previous approach of baseline MVS scan while rows 914 and 924 show the corresponding output base meshes generated by various methods. It may be noted that the progressive mesh generation method described herein does not depend on MVS scan. The output from the progressive mesh generation network is shown in the last right column. When the nose of the subject (case 910) is specular reflective (due to oily skin) or has facial hair, the traditional MVS fails to reconstruct the true surface, producing artifacts that affect the subsequent surface registration step. With conservative optimization parameters (e.g. strong reliance on 3DMM), the result is more robust. However, with the same parameters, it affects the flexibility for fitting detailed shape and motion for other input cases (case 920). Furthermore, the extreme and asymmetrical motion is challenging for fitting only within the morphable model. This case requires "aggressive" fitting, in which less regularizations are applied. Therefore, the inventors point out this dilemma of general parameters in the traditional MVS and registration affects of automation and requires much manual work for high-quality results. The learning based method DFNRMVS cannot output meshes in accurate shape and expressions. On the contrary, the progressive mesh generation model shows superior performances in predicting a reliable mesh, given such challenging inputs. Note that the details, such as closed eyelids and asymmetrical mouth motion are faithfully captured.

Geometric Accuracy

FIG. 8 shows the inferred meshes given images from 15 views, along with error visualizations with the reference scans. The 3DMM regression method cannot fit extreme or subtle expressions (wide mouth open, concave cheek and eye shut). The adaptive space and the online refinement improve DFNRMVS for a better fitting, but it still lacks the accuracy to cover the geometric details. The progressive mesh generation method is capable of predicting base meshes that closely fit the ground truth surfaces. The results recover identities for the subjects and captures challenging expressions such as extreme mouth opening or subtle non-linearity of small muscles movement (concave cheek) which cannot be modeled by linear 3DMMs. The overlay and error visualizations indicate that our reconstruction fits the ground truth scan closely with fitting errors significantly below 5 millimeters. Due to not being able to utilize true projection parameters, the results of 3DMM regression and DFN-RMVS lack accuracy in absolute coordinate and need a Procrustes analysis (scale and rigid pose) as post-processing for further fitting to the target. In contrast, the progressive mesh generation method outperforms these methods without post-processing.

As a quantitative evaluation, the distribution of scan-to-mesh distances is measured. 78.3% of vertices by the progressive mesh generation methods have scan-to-mesh distance lower than 1 mm. This result outperforms the 3DMM regression which have 27.0% and 33.1% (without and with post-processing). The median scan-to-mesh distance for the progression mesh generation results is 0.584 mm, achieving sub-millimeter performance. The cumulative scan-to-mesh distance curves are shown at FIG. 17.

Correspondence Accuracy

Quantitative measure for correspondence accuracy for generated base meshes is provided by comparing them to the ground truth aligned meshes (artist-generated in the same topology), and compute the vertex-to-vertex (v2v) distances on a test set. The 3DMM regression method achieves a median v2v distance of 3.66 mm/2.88 mm (w/o and w/ post-processing). The progressive mesh generation method achieves 1.97 mm outperforming the existing method. The v2v distances are also visualized on the ground truth mesh in FIG. 10. In particular, FIG. 10 shows scan-to-mesh distance in row 1002 and texture map error in row 1004, both visualized as heat maps. The aligned meshes are additionally evaluated by the median errors to the ground truth 3D landmarks.

The progressive mesh generation method achieves 2.02 mm, while the 3DMM regression method achieves 3.92 mm/3.21 mm (w/o and w/ post-processing).

The photometric errors are computed between the texture map of the output meshes and the one of the ground truth meshes. Lower photometric errors indicate the UV textures match the pre-designed UV parametrization (i.e. better correspondence). The progressive mesh generation method has significantly lower errors, especially in the eyebrow region, around the jaw and for wrinkles around eyes and nose. Note that the 3DMM regression method without post-processing performs worse, while our method requires no post-processing.

In FIG. 11, the correspondence quality is further evaluated by projecting it onto 2D images and warping the reference image (extreme expression) back to target image (neutral expression). The ideal warping outputs would be as close to the target image as possible, except for shades as in wrinkles. The performance is compared with traditional pipeline of MVS and registration (with manual adjustment) and the traditional optical flow method. The progressive mesh generation method recovers better 2D correspondence than optical flow, which relies on local matching which tends to fail when occlusion and large motion, as shown in FIG. 11 (see lip regions). Further, optical flow takes 30 seconds on image resolution 1366×1003, compared with 1 second based on the base meshes generated with the progressive mesh generation method.

Inference Speed

The traditional pipeline takes more than 10 minutes and potentially more time for manual adjustments. DFNRMVS infers faces without tuning at test-time but is still slower at 4.5 seconds due to its online optimization step and heavy computation on the dense photometric term. The global and local stage described herein takes 0.081 seconds and 0.304 seconds respectively. As shown in Table 2, the progressive mesh generation method produces a high-quality registered base mesh in 0.385 seconds, and achieves sub-second performance, while being fully automatic without manual tweaking.

TABLE 2

Comparison on run time on base mesh, given images from 15 views and measured in seconds.

| Methods | Time | Automatic |
| --- | --- | --- |
| Traditional pipeline | 600+ | X |
| DFNRMVS | 4.5 | ✓ |
| Progressive mesh generation network | 0.385 | ✓ |

Appearance Capture

In FIG. 12 rendering results with the inferred displacement and albedo and specular maps, enabling photo-realistic renderings, are shown.

Ablation Studies

In FIG. 13A, the robustness of the progressive mesh generation network is demonstrated on various numbers of input views. Base mesh is shown in the top row and scan-to mesh distance is shown in the bottom row. The resulting quality degrades gracefully as the views decrease. The progressive mesh generation method produces reasonable results on views as sparse as 4, which is extremely difficult for standard MVS due to large baseline and little overlaps. FIG. 13B demonstrates the normal displacement in the upsampling function contributes in capturing fine shape details. In FIG. 13B, base mesh overlaid with reference scan is shown in top row and the scan-to mesh distance is shown in the bottom row.

Generalization to New Capture Setups

The progressive mesh generation network is fine-tuned on the CoMA dataset, which contains a different camera setup, significantly fewer views (4) and subjects (12), different lighting conditions and special make-up patterns painted on subjects' faces. The results in FIG. 14 show that the progressive mesh generation method can be applied to the different capture setups. 1402 and 1404 show base meshes;

and 1412 and 1414 show corresponding input images from the CoMA dataset. The CoMA dataset is described in Ranjan A et al. *Generating 3D faces using convolutional mesh autoencoders. In Proc. European Conference on Computer Vision (ECCV)*, pages 725-741, 2018., which is incorporated by reference in its entirety.

On Dense Correspondence

The ground truth datasets utilized for training the progressive mesh generation network utilized dense correspondence, cross-identify dense correspondence, and cross-expression correspondence (by photometric consistency (optical flow or differentiable rendering)) and therefore can be regarded as one of the best curated datasets. With the "best" ground truth one can get as now, the progressive mesh generation network is trained in a supervised manner to the ground truth meshes (same topology) with equal vertex weights. Measuring the distances to the ground truth (v2v and land-mark errors) gives informative and reliable cross-expression evaluations on dense correspondence quality. Furthermore, photometric error visualizations on a shared UV map (as in the main paper) and the stable rendering of reconstructed sequence as in FIG. 12 both qualitatively shows high quality of cross-expression correspondence.

However, quantitative evaluating cross-identity dense correspondence is by nature difficult. These two metrics above indirectly measure for cross-subject correspondence. Here additional visualizations are shown by rendering inferred meshes in a shared checkerboard texture and highlighting some facial landmarks in FIG. 19. At FIG. 19, the input images are shown in columns 1902 and 1904, and the shared checker board textures and facial landmark highlights (in bright green) are shown in column 1912 and 1914. The meshes inferred by the progressive mesh generation method preserve dense semantic correspondences across subjects and expressions, as shown by the landmarks and the uniquely textured regions.

Results on Clothed Human Body Datasets

The progressive mesh generation method can also predict clothed full body meshes in correspondence. The progressive method is tested on a dataset of human bodies as shown in FIG. 18. Human bodies are challenging due to large pose variations and occlusions. Given the challenging inputs, the progressive methods still outputs detailed geometry which closely fit the ground truth surfaces with small scan-to-mesh distances, shown in FIG. 18. Checkerboard projection also shows the accuracy of semantic correspondence among extreme poses. See FIG. 19, for example. The results demonstrate the flexibility of the progressive mesh generation method for highly articulated and diverse surfaces.

In this way, methods and systems are provided for a 3D inference approach from multi-view input images that can produce high-fidelity 3D faces meshes with consistent topology using a volumetric sampling approach. The experimental data demonstrate that given multi-view inputs, implicitly learning a shape variation and deformation field can produce superior results, compared to methods that use an underlying 3DMM even if they refine the resulting inference with an optimization step. Further, the progressive mesh generation method shows demonstrated sub-millimeter surface reconstruction accuracy, and state-of-the-art correspondence performance while achieving up to 3 orders of magnitude of speed improvement over conventional techniques. Most importantly, the progressive mesh generation approach is fully automated and eliminates the need for data clean up after MVS, or any parameter tweaking for conventional non-rigid registration techniques. The experimental data also show that the volumetric feature sampling can aggregate effectively features across views at various scales and can also provide salient information for predicting accurate alignment without the need for any manual post-processing. It will be appreciated that the progressive mesh generation method may be applied beyond the skin region, including teeth, tongue, and eyes. The volumetric digitization framework can handle non-parametric facial surfaces, which could potentially eliminate the need for specialized shaders and models in conventional graphics pipelines. Furthermore, the progressive mesh generation approach can be applied on video sequences. Further still, the progressive mesh generation method is suitable for articulated non-rigid objects such as human bodies, and can be implemented for mesh generation and rendering of general shapes and objects such as clothing and hair Selected Embodiments Although the above description and the attached claims disclose a number of embodiments of the present invention, other alternative aspects of the invention are disclosed in the following further embodiments.

Embodiment 1: A system, comprising: one or more processors; one or more memories storing instructions that are executable by the one or more processors to cause the system to: receive at least two input images of a subject or an object, each of the at least two input images corresponding to a different view of the subject or the object; generate a three-dimensional initial coarse mesh of the subject or the object based on the at least two input images, the three-dimensional initial coarse mesh comprising a first number of vertices; and generate a three-dimensional final base mesh of the subject or the object from the initial coarse mesh, the three-dimensional final base mesh comprising a final number of vertices greater than the first number of vertices of the initial coarse mesh; wherein generating the three-dimensional base mesh from the initial coarse mesh comprises iteratively upsampling and refining a plurality of vertices, starting from the initial coarse mesh to generate a series of intermediate meshes, each successive intermediate mesh having a greater number of vertices than a previous intermediate mesh and less than the final number of vertices of the final base mesh.

Embodiment 2: The system of embodiment 1, wherein generating the three-dimensional coarse mesh comprises generating one or more two-dimensional feature maps for each input image.

Embodiment 3: The system of embodiment 2, wherein generating the three-dimensional coarse mesh further comprises generating a global feature volume within a global three-dimensional grid based on the one or more two-dimensional feature maps.

Embodiment 4: The system of embodiment 3, wherein the feature volume is generated by bilinear sampling and fusing a plurality of two-dimensional image features from each of the two-dimensional feature maps on to corresponding projected coordinates within the three-dimensional grid.

Embodiment 5: The system of embodiment 1, wherein generating the three-dimensional coarse mesh further comprises inferring a corresponding vertex location for each of the number of vertices of the initial coarse mesh based on a probability distribution for the corresponding vertex location.

Embodiment 6: The system of embodiment 5, wherein inferring the corresponding vertex locations comprises inputting the global feature volume into a global geometry network trained to output a plurality of channels, each channel encoding a corresponding probability distribution for the corresponding vertex location.

Embodiment 7: The system of embodiment 6, wherein the global geometry network has a U-net architecture with skip connections.

Embodiment 8: The system of embodiment 1, wherein refining the plurality of vertices comprises updating corresponding positions of the plurality of vertices.

Embodiment 9: The system of embodiment 1, wherein refining the plurality of vertices comprises for each of the plurality of vertices, generating a local volumetric grid, generating a local feature volume for each grid, and updating the position of the corresponding vertex based on a second probability distribution for the position of the corresponding vertex, the second probability distribution based on the corresponding local feature volume.

Embodiment 10: The system of embodiment 9, wherein a size of the local volumetric grid is less than the size of the global grid.

Embodiment 11: The system of embodiment 10, wherein one or more of the volumetric grid and the global grid is a cube.

Embodiment 12: The system of embodiment 9, wherein updating the position of the corresponding vertex based on the second probability distribution comprises inputting the corresponding local feature volume into a local geometry network trained to output a plurality of local channels, each local channel encoding the corresponding second probability distribution for the corresponding vertex location.

Embodiment 13: The system of embodiment 12, wherein the local geometry network has a U-net architecture with skip connections.

Embodiment 14: A system, comprising: one or more processors; one or more memories storing instructions that are executable by the one or more processors to cause the system to at least: receive a plurality of images of a subject or an object, each the plurality of images corresponding to a different camera view angle and a plurality of corresponding camera calibration parameters for each image; generate a three-dimensional coarse mesh based on the plurality of images and the plurality of camera calibration parameters, the three-dimensional initial coarse mesh comprising a first number of vertices; and generate a three-dimensional final base mesh of the subject or the object from the initial coarse mesh, the three-dimensional final base mesh comprising a final number of vertices greater than the first number of vertices of the initial coarse mesh; wherein generating the three-dimensional base mesh from the initial coarse mesh comprises iteratively generating a series of intermediate meshes, each successive intermediate mesh having a greater number of vertices than a previous intermediate mesh and less than the final number of vertices of the final base mesh.

Embodiment 15: The system of embodiment 14, wherein the one or more memories include further instructions that are executable by the processor to cause the system to: generate a global feature volume comprising a plurality of global volumetric features within a global three-dimensional grid based on the plurality of images; for each vertex of the initial coarse mesh, infer a corresponding probability distribution for a corresponding location of a corresponding vertex based on the global volumetric features.

Embodiment 16: The system of embodiment 15, wherein the probability distribution for the corresponding location of the corresponding vertex is inferred by inputting the global feature volume into a global geometry network trained to output a plurality of channels, each channel encoding the corresponding probability distribution for the corresponding vertex location.

Embodiment 17: The system of embodiment 15, wherein iteratively generating the three-dimensional base mesh from the initial coarse mesh comprises iteratively upsampling to successively increase a number of vertices and further refining corresponding positions of each vertex.

Embodiment 18: The system of embodiment 17, wherein refining corresponding positions of each vertex comprises for each vertex, generating a local volumetric grid, generating a local feature volume for each grid, and updating the position of the corresponding vertex based on a second probability distribution for the position of the corresponding vertex, the second probability distribution based on the corresponding local feature volume.

Embodiment 19: The system of embodiment 18, wherein a size of the local volumetric grid is less than the size of the global grid.

Embodiment 20: A method, comprising: receiving, at one or more processors, a plurality of images of the subject or the object, each of the plurality of the images comprising a different view of the subject or the object; generating, via the one or more processors, a three-dimensional initial coarse mesh based on the plurality of images according to a global volumetric feature sampling algorithm; generating, via the one or more processors, a three-dimensional final base mesh of the subject or the object; generating, via the one or more processors, an image rendering of the subject or the object based on the three-dimensional final base mesh; and displaying, via a display portion of a user interface communicatively coupled to the one or more processors, one or more of the initial coarse mesh, the final base mesh, and the image rendering; wherein generating the three-dimensional final base mesh comprises iteratively upsampling starting from the initial coarse mesh to generate a series of intermediate meshes with increasing mesh density.

Embodiment 21: The method of embodiment 20, wherein generating the three-dimensional final base mesh further comprises after each upsampling, refining corresponding positions of vertices in each of the initial coarse mesh and each of the series of intermediate meshes.

Embodiment 22: The method of embodiment 20, wherein generating the three-dimensional coarse mesh further comprises inferring a corresponding vertex location for each of the number of vertices of the initial coarse mesh based on a probability distribution for the corresponding vertex location.

Embodiment 23: The method of embodiment 22, wherein inferring the corresponding vertex locations comprises inputting the global feature volume into a global geometry network trained to output a plurality of channels, each channel encoding a corresponding probability distribution for the corresponding vertex location.

Embodiment 24: The method of embodiment 23, wherein the global geometry network has a U-net architecture with skip connections.

Embodiment 25: The method of embodiment 21, wherein refining the corresponding positions of vertices comprises for each vertex, generating a local volumetric grid, generating a local feature volume for each grid, and updating the position of the corresponding vertex based on a second probability distribution for the position of the corresponding vertex, the second probability distribution based on the corresponding local feature volume.

Embodiment 26: The method of embodiment 25, wherein a size of the local volumetric grid is less than the size of the global grid.

Embodiment 27: The method of embodiment 25, wherein one or more of the volumetric grid and the global grid is a cube.

Embodiment 28: The method of embodiment 25, wherein updating the position of the corresponding vertex based on the second probability distribution comprises inputting the corresponding local feature volume into a local geometry network trained to output a plurality of local channels, each local channel encoding the corresponding second probability distribution for the corresponding vertex location.

Embodiment 29: The method of embodiment 28, wherein the local geometry network has a U-net architecture with skip connections.

Embodiment 30: The method of embodiment 20, wherein the image rendering is a photo-realistic image rendering and/or includes an expression of the subject that is different from an initial expression in the plurality of images.

Embodiment 31: The method of embodiment 25, further comprising generating one or more asset maps based on the final base mesh, the one or more asset maps comprising an albedo map, a geometry map, a specular reflectance map, and a displacement map.

Embodiment 32: The method of embodiment 28, wherein the image rendering is obtained based on the base mesh and at least one of the one or more asset maps.

CONCLUSION

The various methods and techniques described above provide a number of ways to carry out the invention. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, the terms "a" and "an" and "the" and similar references used in the context of describing a particular embodiment of the application (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Certain embodiments of this application are described herein. Variations on those embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

The invention claimed is:

1. A system, comprising:
    one or more processors;
    one or more memories storing instructions that are executable by the one or more processors to cause the system to:

receive at least two input images of a subject or an object, each of the at least two input images corresponding to a different view of the subject or the object;

generate a three-dimensional initial coarse mesh of the subject or the object based on the at least two input images, the three-dimensional initial coarse mesh comprising a first number of vertices, wherein generating the three-dimensional coarse mesh comprises:

generating one or more two-dimensional feature maps for each input image;

generating a global feature volume within a global three-dimensional grid based on the one or more two-dimensional feature maps; and inferring a corresponding vertex location for each of the number of vertices of the initial coarse mesh based on a probability distribution for the corresponding vertex location, wherein inferring the corresponding vertex locations comprises inputting the global feature volume into a global geometry network trained to output a plurality of channels, each channel encoding a corresponding probability distribution for the corresponding vertex location; and generate a three-dimensional final base mesh of the subject or the object from the initial coarse mesh, the three-dimensional final base mesh comprising a final number of vertices greater than the first number of vertices of the initial coarse mesh;

wherein generating the three-dimensional base mesh from the initial coarse mesh comprises iteratively upsampling and refining a plurality of vertices, starting from the initial coarse mesh to generate a series of intermediate meshes, each successive intermediate mesh having a greater number of vertices than a previous intermediate mesh and less than the final number of vertices of the final base mesh, and wherein the upsampling is based on additional normal displacement weights.

2. The system of claim 1, wherein the feature volume is generated by bilinear sampling and fusing a plurality of two-dimensional image features from each of the two-dimensional feature maps on to corresponding projected coordinates within the three-dimensional grid.

3. The system of claim 1, wherein the global geometry network has a U-net architecture with skip connections.

4. The system of claim 1, wherein refining the plurality of vertices comprises updating corresponding positions of the plurality of vertices.

5. The system of claim 1, wherein refining the plurality of vertices comprises for each of the plurality of vertices, generating a local volumetric grid, generating a local feature volume for each grid, and updating the position of the corresponding vertex based on a second probability distribution for the position of the corresponding vertex, the second probability distribution based on the corresponding local feature volume.

6. A system, comprising:

one or more processors;

one or more memories storing instructions that are executable by the one or more processors to cause the system to at least:

receive a plurality of images of a subject or an object, each the plurality of images corresponding to a different camera view angle and a plurality of corresponding camera calibration parameters for each image;

generate a three-dimensional coarse mesh based on the plurality of images and the plurality of camera calibration parameters, the three-dimensional initial coarse mesh comprising a first number of vertices;

generate a global feature volume comprising a plurality of global volumetric features within a global three-dimensional grid based on the plurality of images;

for each vertex of the initial coarse mesh, infer a corresponding probability distribution for a corresponding location of a corresponding vertex based on the global volumetric features, wherein the probability distribution for the corresponding location of the corresponding vertex is inferred by inputting the global feature volume into a global geometry network trained to output a plurality of channels, each channel encoding the corresponding probability distribution for the corresponding vertex location; and generate a three-dimensional final base mesh of the subject or the object from the initial coarse mesh, the three-dimensional final base mesh comprising a final number of vertices greater than the first number of vertices of the initial coarse mesh;

wherein generating the three-dimensional base mesh from the initial coarse mesh comprises iteratively generating a series of intermediate meshes, each successive intermediate mesh having a greater number of vertices than a previous intermediate mesh and less than the final number of vertices of the final base mesh, wherein the iterative generation of intermediate meshes includes upsampling a plurality of vertices based on additional normal displacement.

7. The system of claim 6, wherein the upsampling of the iteratively generating the three-dimensional base mesh from the initial coarse mesh is performed to successively increase a number of vertices and further refining corresponding positions of each vertex.

8. The system of claim 7, wherein refining corresponding positions of each vertex comprises for each vertex, generating a local volumetric grid, generating a local feature volume for each grid, and updating the position of the corresponding vertex based on a second probability distribution for the position of the corresponding vertex, the second probability distribution based on the corresponding local feature volume.

9. A method, comprising:

receiving, at one or more processors, a plurality of images of the subject or the object, each of the plurality of the images comprising a different view of the subject or the object;

generating, via the one or more processors, a three-dimensional initial coarse mesh based on the plurality of images according to a global volumetric feature sampling algorithm, the initial coarse mesh comprising a number of vertices and inferring a corresponding vertex location for each of the number of vertices of the initial coarse mesh based on a probability distribution for the corresponding vertex location, wherein inferring the corresponding vertex locations comprises inputting a global feature volume into a global geometry network trained to output a plurality of channels, each channel encoding a corresponding probability distribution for the corresponding vertex location;

generating, via the one or more processors, a three-dimensional final base mesh of the subject or the object;

generating, via the one or more processors, an image rendering of the subject or the object based on the three-dimensional final base mesh; and displaying, via a display portion of a user interface communicatively coupled to the one or more processors, one or more of the initial coarse mesh, the final base mesh, and the image rendering;

wherein generating the three-dimensional final base mesh comprises iteratively upsampling starting from the initial coarse mesh to generate a series of intermediate meshes with increasing mesh density, and wherein the upsampling is based on additional normal displacement weights.

10. The method of claim 9, wherein generating the three-dimensional final base mesh further comprises after each upsampling, refining corresponding positions of vertices in each of the initial coarse mesh and each of the series of intermediate meshes.

11. The method of claim 9, wherein the global geometry network has a U-net architecture with skip connections.

12. The method of claim 10, wherein refining the corresponding positions of vertices comprises for each vertex, generating a local volumetric grid, generating a local feature volume for each grid, and updating the position of the corresponding vertex based on a second probability distribution for the position of the corresponding vertex, the second probability distribution based on the corresponding local feature volume.

* * * * *